(12) United States Patent
Choi et al.

(10) Patent No.: US 10,605,533 B2
(45) Date of Patent: Mar. 31, 2020

(54) DEAERATOR

(71) Applicant: DOOSAN HEAVY INDUSTRIES & CONSTRUCTION CO., LTD., Gyeongsangnam-do (KR)

(72) Inventors: Young Jun Choi, Busan (KR); Eung Chan Lee, Seoul (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 144 days.

(21) Appl. No.: 15/250,682

(22) Filed: Aug. 29, 2016

(65) Prior Publication Data

US 2017/0059251 A1   Mar. 2, 2017

(30) Foreign Application Priority Data

Sep. 1, 2015 (KR) .................. 10-2015-0123417
Sep. 1, 2015 (KR) .................. 10-2015-0123418

(Continued)

(51) Int. Cl.
*B01D 19/00* (2006.01)
*F28B 9/08* (2006.01)
*F28B 3/00* (2006.01)
(Continued)

(52) U.S. Cl.
CPC .............. *F28B 9/08* (2013.01); *B01D 19/001* (2013.01); *B01D 19/0005* (2013.01);
(Continued)

(58) Field of Classification Search
CPC .... B01D 19/00–0495; F28B 9/08; F28B 3/00; F28B 9/10; F01K 9/003; F01K 9/02;
(Continued)

(56) References Cited

U.S. PATENT DOCUMENTS

| | | | | |
|---|---|---|---|---|
| 5,405,435 A | * | 4/1995 | Bekedam | B01D 19/001 261/DIG. 32 |
| 6,079,372 A | * | 6/2000 | Bekedam | B01D 19/001 122/451 R |

(Continued)

FOREIGN PATENT DOCUMENTS

| | | |
|---|---|---|
| CN | 1104551 A | 7/1995 |
| CN | 2713304 Y | 7/2005 |

(Continued)

OTHER PUBLICATIONS

European Search Report dated Mar. 9, 2017 by EPO in connection with European Patent Application No. 16186620.7.

*Primary Examiner* — T. Bennett McKenzie
(74) *Attorney, Agent, or Firm* — Invenstone Patent, LLC

(57) ABSTRACT

A deaerator includes a tank, a spray unit, a steam supply unit, a bleed unit and a discharge pipe. The spray unit is disposed at an upper portion of the tank and configured to supply water to the tank. The steam supply unit is disposed inside the tank to supply steam to the tank. The bleed unit is disposed at the upper portion of the tank and adjacent to the spray unit. The bleed unit is configured to bleed air from an inside of the tank. The discharge pipe is configured to discharge water without air to an outside of the tank.

9 Claims, 19 Drawing Sheets

(30) Foreign Application Priority Data

Sep. 2, 2015 (KR) ........................ 10-2015-0124302
Sep. 4, 2015 (KR) ........................ 10-2015-0125809

(51) Int. Cl.
```
F28B 9/10      (2006.01)
F01K 9/02      (2006.01)
F01K 9/00      (2006.01)
F22D 11/00     (2006.01)
F24S 40/48     (2018.01)
F22D 1/50      (2006.01)
C02F 1/20      (2006.01)
```
(52) U.S. Cl.
CPC .......... *B01D 19/0047* (2013.01); *F01K 9/003* (2013.01); *F01K 9/02* (2013.01); *F22D 11/00* (2013.01); *F24S 40/48* (2018.05); *F28B 3/00* (2013.01); *F28B 9/10* (2013.01); *C02F 1/20* (2013.01); *F22D 1/50* (2013.01); *Y02E 10/40* (2013.01)

(58) Field of Classification Search
CPC .. F22D 11/00; F22D 1/50; F24J 2/462; Y02E 10/40; C02F 1/20

USPC .......................................................... 96/203
See application file for complete search history.

(56) References Cited

U.S. PATENT DOCUMENTS

2010/0199670 A1\* 8/2010 Robertson .......... B01D 19/0015
  60/657
2013/0074696 A1\* 3/2013 Averesch ................. B01D 1/16
  95/266

FOREIGN PATENT DOCUMENTS

| | | |
|---|---|---|
| CN | 102439264 A | 5/2012 |
| JP | H05154307 A | 6/1993 |
| JP | H0688604 A | 3/1994 |
| JP | H0788470 A | 4/1995 |
| JP | H07190306 A | 7/1995 |
| JP | 2003285049 A | 10/2003 |
| JP | 2012037175 A | 2/2012 |
| NO | 2009068616 A1 | 6/2009 |

\* cited by examiner

Prior Art 1210, 1220, 1230, 1240 : 1200

DEAERATOR

CROSS REFERENCE TO RELATED APPLICATIONS

This application claims priority to Korean Patent Application No. 10-2015-0123417, filed Sep. 1, 2015; Korean Patent Application No. 10-2015-0123418, filed Sep. 1, 2015; Korean Patent Application No. 10-2015-0124302, filed Sep. 2, 2015; and Korean Patent Application No. 10-2015-0125809, filed Sep. 4, 2015, all of which are incorporated by reference in their entirety.

BACKGROUND

Exemplary embodiments of the present disclosure relate to a deaerator, and more particularly, to a deaerator for a thermal power plant capable of increasing a deaeration effect by making a direction of steam sprayed from a steam supply unit in an internal space of a tank the same of different as a direction of water sprayed from a spray unit.

Generally, a thermal power plant is an apparatus that converts heat energy generated by combusting fossil fuel such as coal, petroleum, and gas into mechanical energy and then produces electric energy using a steam turbine.

The steam turbine generates shaft power while being supplied with high temperature high pressure superheated steam to drop a pressure to a low pressure to operate a power generator, thereby producing electricity. Air is introduced in a last step during the process. The introduced air is removed by a vacuum pump or an ejector in a steam condenser. However, when condensed water is sub-cooled, some of the air is dissolved in water.

FIG. 1 is a configuration diagram of a thermal power generation system.

As illustrated in FIG. 1, water is discharged as high temperature high pressure steam from a boiler 1 during the power generation of the thermal power plant.

The discharged high temperature high pressure steam is introduced into a steam turbine 2 to be discharged as low temperature low pressure vapor while heat energy of steam is converted into mechanical energy. In this case, the shaft of the turbine is rotated to produce electricity.

A process of converting low temperature low pressure vapor into water in a condenser 3 is repeated.

Since impurities such as inorganic matters are accumulated in the boiler, about 4-5% of the water is discharged and new water is injected. Since the new water includes oxygen, when there is a need to inject a lot of water during the power generation, a condenser tank 4 is installed at a rear end of the condenser.

In this case, a deaerator 5 is used to remove oxygen dissolved in the injected water. When water passes through a feed water heater while it moves to the deaerator 5, temperature rises and the oxygen dissolved in the water chemically reacts to organic matter dissolved in the water in an activated gas state to be converted into impurities. Some of the so produced impurities stick on a surface of a heat exchanger. Further, the impurities that are stuck on a surface of the boiler accelerate oxidation corrosion of iron.

To address the above problem, the deaerator is used prior to delivering the supplemental water to a condensation water tank to remove oxygen dissolved in the supplemental water and then deliver water to the condensation water tank. That is, generally, the deaerator is an apparatus for removing gas, in particular oxygen, dissolved in water.

Generally, the existing thermal power plant has used a spray tray type of deaerator. However, the existing deaerator may have a small residence time of steam and may not increase a contact surface area of water with steam as the steam supplied from the steam supply unit is sprayed only in one direction, and therefore to increase the deaeration, a capacity or a size of the deaerator needs to be increased, such that the deaerator may hardly be miniaturized.

Further, the existing deaerator has a problem in that a tube of the heat exchanger of the boiler may be corroded because the deaeration effect is not increased and thus gases such as oxygen are included in water supplied to the boiler.

In addition, the existing deaerator has a problem in that performance of the heat exchanger, that is, efficiency of the thermal power plant is reduced.

BRIEF SUMMARY

In an example, a deaerator includes a tank, a spray unit, a steam supply unit, a bleed unit and a discharge pipe. The spray unit is disposed at an upper portion of the tank and configured to supply water to the tank. The steam supply unit is disposed inside the tank to supply steam to the tank. The bleed unit is disposed at the upper portion of the tank and adjacent to the spray unit. The bleed unit is configured to bleed air from an inside of the tank. The discharge pipe is configured to discharge water without air to an outside of the tank.

In another example, a deaerator includes a tank, a baffle, a spray unit, a main steam supply pipe, a bleed unit, at least one porous plate, and a discharge pipe. The baffle is disposed inside the tank to partition an inside of the tank. The spray unit is disposed at an upper portion of the tank and configured to supply water to the tank. The main steam supply pipe extends along a length direction of a lower portion inside the tank and is configured to supply steam to the tank. The main steam supply pipe includes a plurality of discharge holes arranged in a longitudinal direction. The bleed unit is disposed at the upper portion of the tank and adjacent to the spray unit. The bleed unit is configured to bleed air from an inside of the tank. The least one porous plate is installed between the spray unit and the main steam supply pipe along a length direction of the tank. The discharge pipe is configured to discharge water without air to an outside of the tank.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
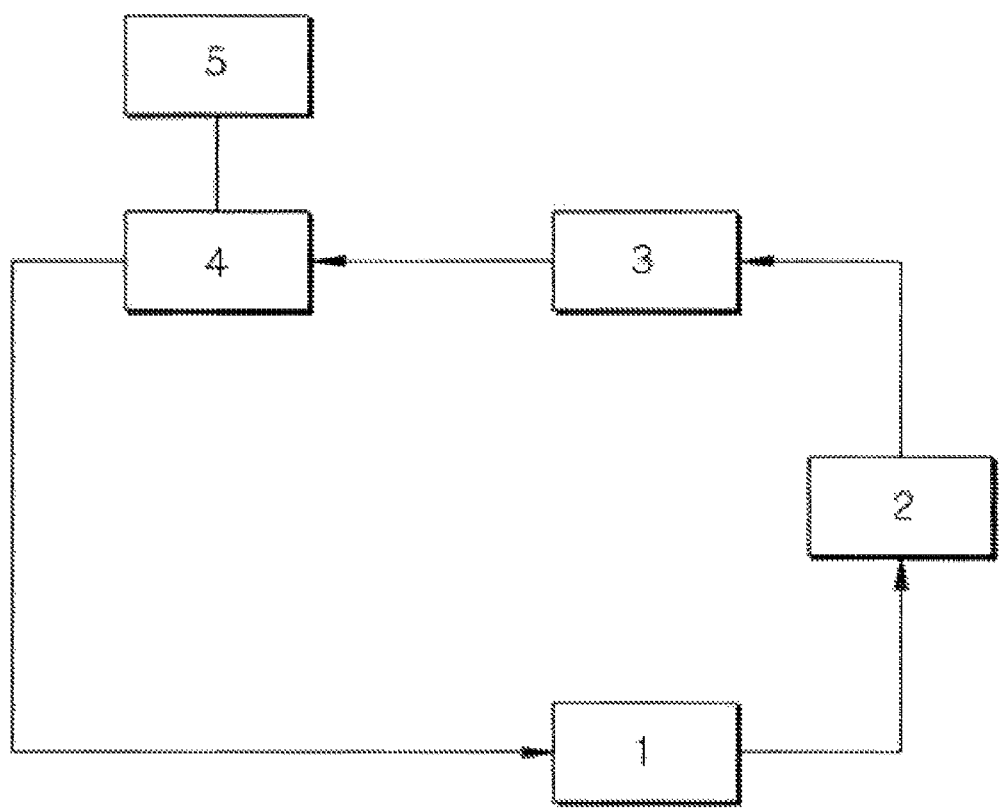
FIG. 1 is a configuration diagram of a thermal power generation system.

Exemplary embodiments of the present disclosure will be described in detail with reference to the accompanying drawings. In the drawings, like components are denoted by like reference numerals.

An object of the present disclosure relates to a deaerator for a thermal power plant capable of improving or maximizing a deaeration effect, limiting or preventing a corrosion of a boiler tube, and improving efficiency of a thermal power plant by increasing a residence time of steam sprayed from a steam supply unit within a tank and a contact surface area of the steam with water.

Other objects and advantages of the present disclosure can be understood by the following description, and become apparent with reference to the embodiments of the present disclosure. Also, it will be appreciated by those skilled in the art to which the present disclosure pertains that the objects and advantages of the present disclosure can be realized by the aspects as claimed and combinations thereof.

In accordance with one aspect of the present disclosure, a deaerator includes: a tank; a spray unit installed at an upper portion of the tank to supply water; a steam supply unit installed inside the tank to supply steam; a bleed unit installed at the upper portion of the tank to be adjacent to the spray unit so as to bleed air of an inside of the tank; and a discharge pipe discharging water without air to an outside of the tank.

The spray unit may include: a water supply pipe having one side connected to a water supply part and the other side connected to an upper portion inside the tank; a distribution pipe communicating with the other side of the water supply pipe and extended along a length direction of the tank; and a plurality of nozzle parts longitudinally installed in the distribution pipe to spray water toward a lower portion inside the tank in a droplet form.

The bleed unit may include: a bleed pipe having one side connected to the inside of the tank and the other side communicating with the outside of the tank; and a bleed valve installed at a portion of the bleed pipe.

The steam supply unit may include: a first steam supply pipe extended along the length direction of the tank in the tank and provided with a plurality of first discharge holes along the length direction of the tank to supply steam in the same direction as direction of water supplied from the plurality of nozzle parts; a connection pipe partitioning the inside of the tank and having one side communicating with the first steam supply pipe; and a second steam supply pipe having one side communicating with the connection pipe, extended along the length direction of the tank in the tank, and having a plurality of second discharge holes formed along the length direction of the tank to supply steam in a different direction from the plurality of first discharge holes.

The steam supply unit may further include a blocking plate installed at an upper portion to which the first steam supply pipe and the connection pipe are connected.

The deaerator may further include: at least one baffle installed at the inside of the tank to partition the inside of the tank.

The inside of the tank may be provided with a first baffle, a second baffle, a third baffle, and a fourth baffle, in which the adjacent baffles of the first, second, third, and fourth baffles may be installed at different heights along the length direction of the tank to partition the tank into five sections, a first section, a second section, a third section, a fourth section, and a fifth section along the length direction of the tank and each of the partitions of the tank in which the spray unit and the bleed unit are installed and each of the partitions of the tank in which a main steam supply pipe and a discharge hole are installed may be differently formed.

The spray unit and the bleed unit may each be installed at upper portions of the first section and the third section of the tank and the discharge hole of the main steam supply pipe may be formed along a length direction of the main steam supply pipe installed in the second section and the fourth section of the tank.

Each spray unit may include: a water supply pipe having one side connected to a water supply part and the other side connected to an upper portion inside the tank; a distribution pipe communicating with the other side of the water supply pipe and extended along a length direction of the tank; and a plurality of nozzle parts longitudinally installed in the distribution pipe to spray water toward a lower portion inside the tank in a droplet form.

Each bleed unit may include: a bleed pipe having one side connected to the inside of the tank and the other side communicating with the outside of the tank; and a bleed valve installed at a portion of the bleed pipe.

In the first baffle and the third baffle, an upper end portion of the first baffle and an upper end portion of the third baffle may be positioned above a highest water level of water stored in the tank and the first baffle and the third baffle may be installed in the tank so that a lower end portion of the first baffle and a lower end portion of the third baffle are positioned below an upper end portion of the second baffle and an upper end portion of the fourth baffle along a height direction of the tank.

The first section and the second section may communicate with each other by a first communication hole formed between the lower end portion of the first baffle and the main steam supply pipe and the third section and the fourth section may communicate with each other by a second communication hole formed between the lower end portion of the third baffle and the main steam supply pipe.

The water stored in the tank may be circulated so that an up and down direction is opposite to each other in a direction from the first section to the fifth section.

The deaerator may further include the first auxiliary steam supply pipe communicating with the main steam supply pipes installed in the second section and the fourth section of the tank and extended along the width direction of the tank from the main steam supply pipe, in which the first auxiliary steam supply pipe may be provided with a plurality of first auxiliary discharge holes along the width direction of the tank.

The discharge pipe may be installed in the fifth section.

The deaerator may further include a sparger unit facing the spray unit and communicating with the main steam supply pipe to supply steam.

The sparger unit may include: a vertical connection pipe communicating with the main steam supply pipe and installed along a height direction of the tank to be vertical to the main steam supply pipe; and an auxiliary steam supply pipe communicating with the vertical connection pipe and extended along the length direction of the tank to be parallel with the main steam supply pipe, in which a plurality of auxiliary discharge holes may be formed along a length direction of the auxiliary steam supply pipe.

The sparger unit may further include a blocking plate formed to enclose the auxiliary steam supply pipe.

The first baffle and the second baffle may be installed inside the tank along the height direction of the tank to partition the tank into three sections, a first section, a second section, and a third section along the length direction of the tank based on the first baffle and the second baffle, the spray unit and the bleed unit may be installed at an upper portion of the first section of the tank, the main steam supply pipe may be installed in the first section and the second section, and the sparger unit may face the spray unit and may be installed in the first section to be positioned at the upper portion of the main steam supply pipe.

An upper end portion of the first baffle may be installed to be positioned above an upper end portion of the second baffle.

The deaerator may further include a porous plate installed at the upper portion of the main steam supply pipe in the second section of the tank along the length direction of the tank.

The porous plate may be provided with a plurality of through holes having a size enough to pass the steam discharged from the main steam supply pipe regularly or irregularly.

The discharge pipe may be installed in the third section.

The deaerator may further include an extended steam supply pipe communicating with the main steam supply pipe and extended along the vertical direction of the tank from the main steam supply pipe, in which the extended steam supply pipe may be provided with a plurality of extended discharge holes along the horizontal direction of the tank.

In accordance with another aspect of the present disclosure, a deaerator includes: a tank; a baffle installed inside the tank to partition an inside of the tank; a spray unit installed at an upper portion of the tank to supply water; a main steam supply pipe extended along a length direction of a lower portion inside the tank to supply steam and longitudinally provided with a plurality of discharge holes; a bleed unit installed at the upper portion of the tank to be adjacent to the spray unit so as to bleed air of an inside of the tank; a scrubber unit agitating the water supplied from the spray unit with the steam supplied from the main steam supply pipe; and a discharge pipe discharging water without air to an outside of the tank.

The spray unit may include: a water supply pipe having one side connected to a water supply part and the other side connected to an upper portion inside the tank; a distribution pipe communicating with the other side of the water supply pipe and extended along a length direction of the tank; and a plurality of nozzle parts longitudinally installed in the distribution pipe to spray water toward an upper portion inside the tank in a droplet form.

The scrubber unit may include: a waterspout part collecting the water sprayed from the plurality of nozzle parts; a scrubber installed to communicate with the main steam supply pipe; and a connection pipe having one side connected to the waterspout part and the other side connected to the scrubber to supply water to the scrubber.

The first baffle and the second baffle may be installed inside the tank along the height direction of the tank to partition the tank into three sections, a first section, a second section, and a third section along the length direction of the tank based on the first baffle and the second baffle, the spray unit and the bleed unit may be installed at an upper portion of the first section of the tank, the main steam supply pipe may be installed at the lower portions of the first section and the second section, and the sparger unit may be installed in the first section to be positioned between the spray unit and the main steam supply pipe.

An upper end portion of the first baffle may be installed to be positioned above an upper end portion of the second baffle.

The baffle may have one baffle installed at one side inside the tank along the height direction of the tank to partition the tank into three sections, a first section, a second section, and a third section along the length direction of the tank based on the blocking plate and the baffle, the spray unit and the bleed unit may be installed at the upper portion of the first section of the tank, the first steam supply pipe may be installed in the first section, and the connection pipe and the second steam supply pipe may be installed in the second section.

The connection pipe of the steam supply unit may further include a plurality of third discharge holes formed in the communication pipe along the height direction of the tank to supply the steam.

The discharge pipe may be installed in the third section.

The second section and the third section of the tank may communicate with each other by a communication hole formed between the lower end portion of the baffle and the lower end portion of the tank.

In accordance with still another aspect of the present disclosure, a deaerator includes: a tank; a baffle installed inside the tank to partition an inside of the tank; a spray unit installed at an upper portion of the tank to supply water; a main steam supply pipe extended along a length direction of a lower portion inside the tank to supply steam and longitudinally provided with a plurality of discharge holes; a bleed unit installed at the upper portion of the tank to be adjacent to the spray unit so as to bleed air of an inside of the tank; at least one porous plate installed between the spray unit and the main steam supply pipe along a length direction of the tank; and a discharge pipe discharging water without air to an outside of the tank.

The baffle may have one baffle installed at a center inside the tank along a height direction of the tank to partition the tank into two sections from side to side, a first section and a second section along the length direction of the tank based on the baffle, the spray unit and the bleed unit may be installed at an upper portion of the first section of the tank, and the main steam supply pipe may be installed in the first section and the second section, and a first porous plate may be installed along the length direction of the main steam supply pipe to be positioned between the spray unit and the main steam supply pipe in the first section.

The first section and the second section of the tank may communicate with each other by a first communication hole formed between the lower end portion of the baffle and the lower end portion of the tank.

The discharge pipe may be installed in the second section.

The first baffle and a second baffle may be installed inside the tank along the height direction of the tank to partition the tank into three sections, a first section, a second section, and a third section along the length direction of the tank based on the first baffle and the second baffle, the spray unit and the bleed unit may be installed at an upper portion of the first section of the tank, the main steam supply pipe may be installed in the first section and the second section, and the first porous plate may be installed along the length direction of the main steam supply pipe to be positioned between the spray unit and the main steam supply pipe in the first section.

The first section and the second section may communicate with each other by the first communication hole formed between the lower end portion of the first baffle and the lower end portion of the tank and the second section and the third section may communicate with each other by the second communication hole formed between the lower end portion of the second baffle and the lower end portion of the tank.

The discharge pipe may be installed in the third section.

The second porous plate may be installed along the length direction of the main steam supply pipe to be positioned at the same height as the first porous plate in the second section.

The third porous plate may be installed along the length direction of the main steam supply pipe to be parallel with the first porous plate while being positioned between the first porous plate and the spray unit in the first section.

The first, second, and third porous plates may be each provided with the plurality of through holes having a size enough to pass the steam discharged from the main steam supply pipe regularly or irregularly.

The deaerator may further include the first auxiliary steam supply pipe communicating with the main steam supply pipes and extended along the width direction of the tank from the main steam supply pipe, in which the first auxiliary steam supply pipe may be provided with the plurality of first auxiliary discharge holes along the width direction of the tank.

The deaerator may further include the second auxiliary steam supply pipe communicating with the main steam supply pipe and extended along the height direction of the tank from the main steam supply pipe, in which the second auxiliary steam supply pipe may be provided with the plurality of second auxiliary discharge holes along the height direction of the tank.

According to the deaerator in accordance with the present disclosure, the steam supply unit may be formed to spray the steam sprayed from the steam supply unit in the internal space of the tank in the same direction as and the opposite direction to the water sprayed from the spray unit according to the space in which the spray unit is installed to increase the residence time of the steam and the contact surface area of the steam with the water, thereby improving or maximizing the deaeration effect.

According to the deaerator in accordance with the present disclosure, the inside of the tank may be partitioned into the plurality of spaces, that is, a total of five spaces along the length direction of the tank by the first, second, third, and fourth baffles and the spaces in which the plurality of spray units and the discharge holes of the main steam supply pipes are formed are differently formed in each space of the tank to generate turbulence in the water stored in the tank and the flow of water may be induced into the discharge pipe while flowing vertically and horizontally, thereby improving or maximizing the deaeration effect.

The deaerator according to the present disclosure uses the combination of the sparger unit facing the spray unit and communicating with the main steam supply pipe and the spray unit or the combination of the scrubber unit for agitating the water supplied from the spray unit with the steam supplied from the main steam supply pipe and the spray unit to increase the residence time of the steam discharged from the main steam supply pipe and increase the contact surface area of the steam with the water, thereby improving or maximizing the deaeration effect.

Further, the deaerator according to the present disclosure may increase the residence time of the steam discharged from the main steam supply pipe by the porous plate installed at the upper portion of the main steam supply pipe in the second section along the length direction of the tank and increase the contact surface area of the steam with the water, thereby increasing the deaeration effect.

The deaerator according to the present disclosure may generate the turbulence in the water stored in the tank through the spray unit by at least one porous plate installed between the spray unit and the main steam supply pipe along the length direction of the tank, increase the residence time of the steam discharged from the main steam supply pipe, and increase the contact surface area of the steam with the water, thereby improving or maximizing the deaeration effect.

Further, the deaerator according to the present disclosure may be manufactured by maintaining the size of the tank of the deaerator at the same size as before and more reducing the size of the tank than before to increase the deaeration effect, thereby promoting the miniaturization of the deaerator.

Further, the deaerator according to the present disclosure may prevent the tube of the heat exchanger from corroding with the increase in the deaeration effect and improve the heat exchange performance, thereby increasing the efficiency of the thermal power plant.

It is to be understood that both the foregoing general description and the following detailed description of the present disclosure are exemplary and explanatory and are intended to provide further explanation of the aspects as claimed.

Figure 2:
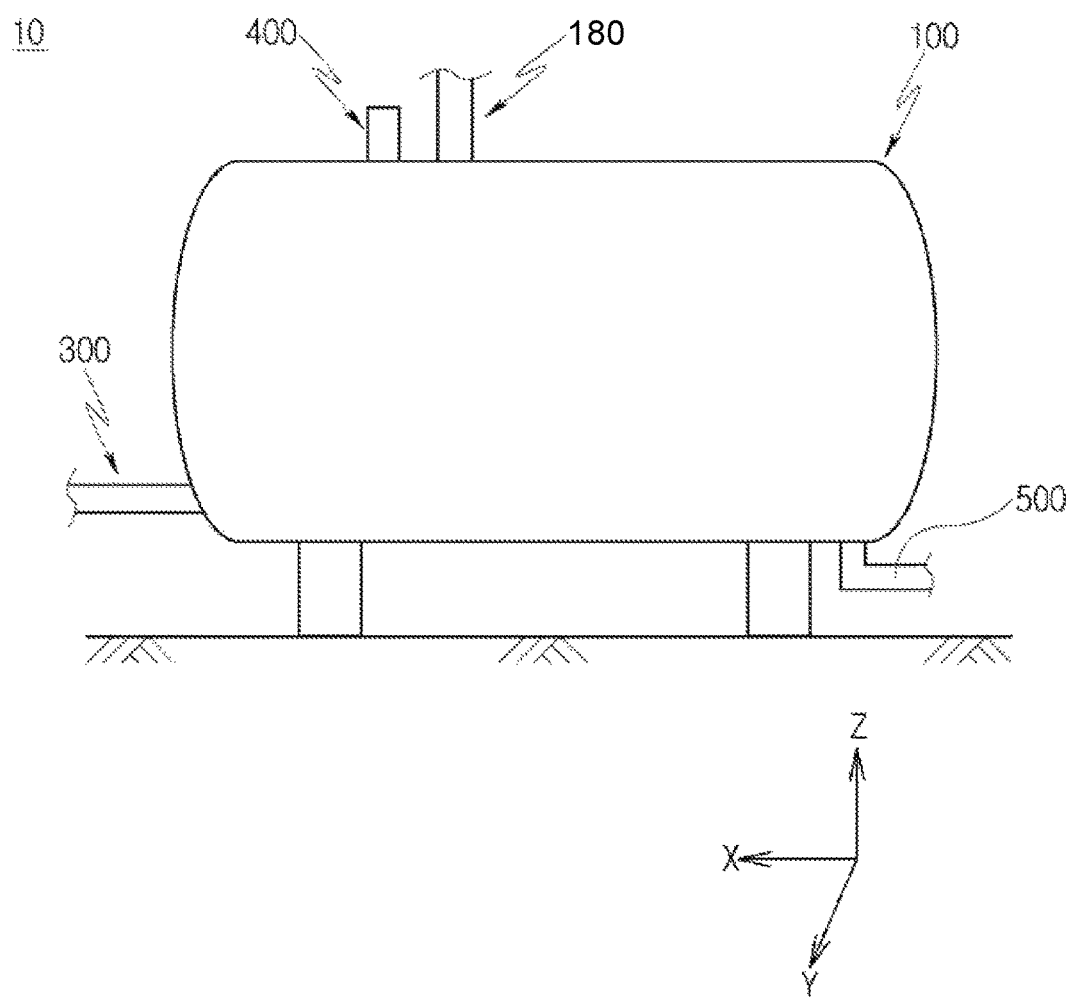
FIG. 2 is a front view of a deaerator according to a first embodiment of the present invention.
Figure 3:
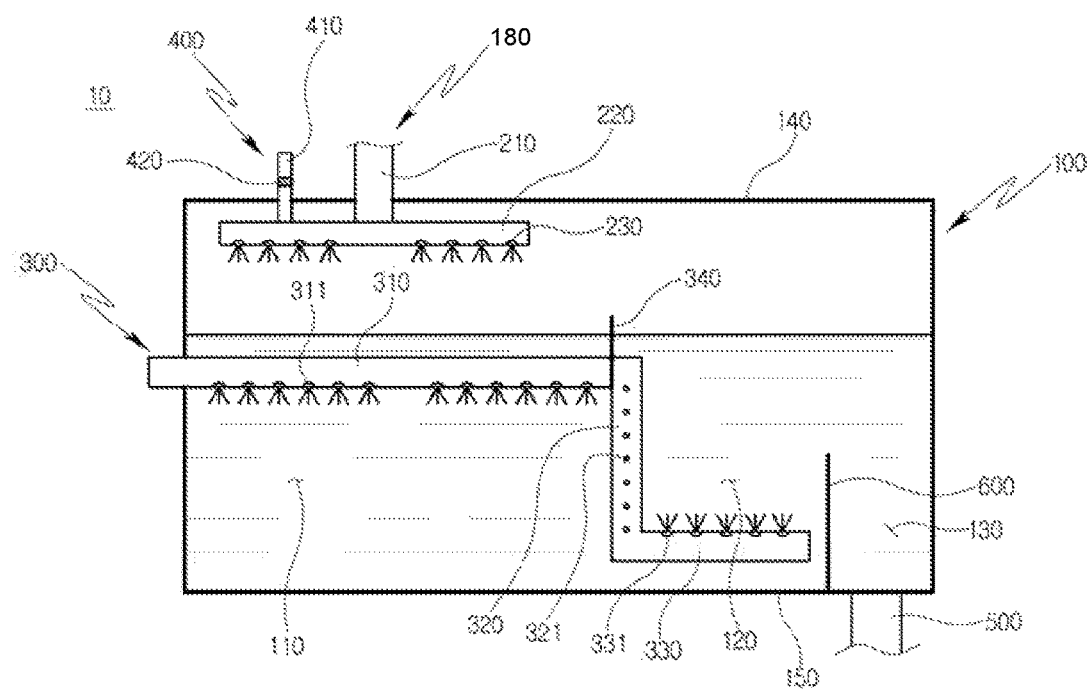
FIG. 3 is a cross-sectional of FIG. 2.
Figure 4:
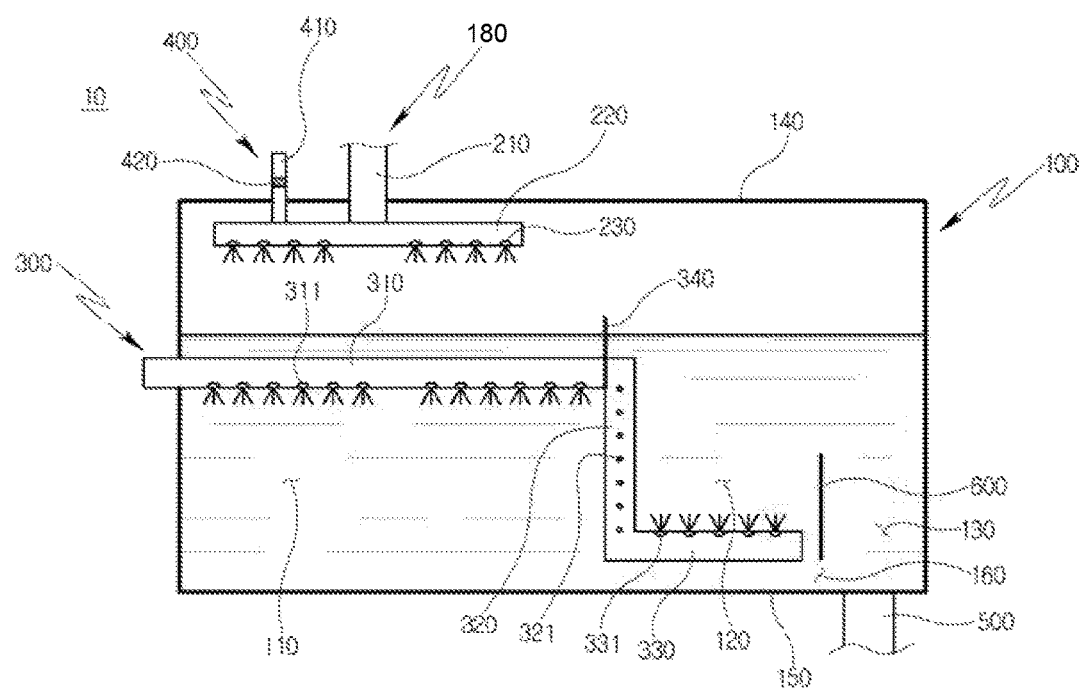
FIG. 4 is a cross-sectional view of a deaerator according to a second embodiment of the present disclosure.

FIG. 2 is a front view of a deaerator according to a first embodiment of the present disclosure, FIG. 3 is a front cross-sectional view (through the middle of tank 100) of FIG. 2, and FIG. 4 is a cross-sectional view of a deaerator according to a second embodiment of the present disclosure.

Terms used in the present disclosure may be defined as follows. The "length direction (X)" means a vertical direction of a tank, that is, a direction on the basis of a straight distance from one side of the tank to the other side thereof. The "height direction (Z)" means a vertical direction of the tank, that is, a direction on the basis of a vertical straight distance from a ground to an upper portion of the tank. The "width direction (Y)" means a direction that is vertical to a length direction and a height direction of the tank and is on the basis of a straight distance from a front of the tank to a rear thereof in the drawing.

A deaerator 10 according to a first embodiment of the present disclosure will be described with reference to FIGS. 2 and 3.

The deaerator 10 according to the first embodiment of the present disclosure includes a tank 100, a spray unit 180, a steam supply unit 300, a bleed unit 400, and a discharge pipe 500.

Further, as illustrated in FIGS. 3 and 4, the deaerator 10 according to the second embodiment of the present disclosure includes a baffle 600.

The tank 100 includes a predetermined length, height, and width. That is, the tank 100 includes a predetermined volume and forms an appearance of the deaerator 10.

FIGS. 2 to 4 illustrate that the tank 100 is formed in a cylindrical shape, but the shape of the tank 100 is not necessarily limited thereto and therefore the tank 100 may be formed in a rectangular parallelepiped shape or any other shape.

The baffle 600 is installed inside the tank 100 to partition an inside of the tank 100.

The spray unit 180 is installed at an upper portion 140 of the tank 100. Water is supplied to the inside of the tank 100 in a droplet form by the spray unit 180.

The steam supply unit 300 is extended along a length direction X of the tank 100. Although not necessarily limited thereto, the main steam supply pipe 400 is formed below a highest water level inside the tank 100 and is installed to submerge under water in the tank 100.

The bleed unit 400 is installed at the upper portion 140 of the tank 100 to be adjacent to the spray unit 180.

Air without water bleeds to an outside of the tank 100 through the bleed unit 400.

To discharge the water without air to the outside of the tank 100, a discharge pipe 500 is installed at a portion of the tank 100.

As illustrated in FIGS. 3 and 4, the steam supply unit 300 of the deaerator 10 according to the first and second embodiments of the present disclosure includes a first steam supply pipe 310, a connection pipe 320, and a second steam supply pipe 330.

Further, as illustrated in FIGS. 3 and 4, the steam supply unit 300 of the deaerator 10 according to another embodiment of the present disclosure may further include a blocking plate 340.

The first steam supply pipe 310 is extended along the length direction X of the tank 100 at a predetermined height in the tank 100.

The first steam supply pipe 310 is provided with a plurality of first discharge holes 311 along the length direction X of the tank 100 to supply steam in the same direction as water supplied from a nozzle part 230 of the spray unit 180 to be described below.

That is, the plurality of first discharge holes 311 are formed along the length direction of the first steam supply pipe 310 to be toward a lower portion 150 of the tank 100, like the nozzle part 230.

Therefore, the steam is supplied in the same direction as water to be toward the lower portion 150 of the tank 100 from the upper portion 140 of the tank 100 through the first discharge hole 311.

A connection pipe 320 partially partitions the inside of the tank 100 and one side of the connection pipe 320 is formed to communicate with a front end of the first steam supply pipe 310.

The connection pipe 320 is provided with a plurality of third discharge holes 321 formed along a height direction Z of the tank to supply steam.

That is, the plurality of third discharge holes 321 are formed along a height direction of the connection pipe 320. The third discharge hole 321 is formed at one side surface or both side surfaces of the connection pipe 320 to discharge steam toward a width direction of the tank 100.

The second steam supply pipe 330 communicates with the other side of the connection pipe 320 and is extended along the length direction X of the tank 100 at a different height from the first steam supply pipe 310 in the tank 100.

That is, the second steam supply pipe 330 is formed to be parallel with the first steam supply pipe 310 along the height direction Z of the tank 100 at a different height from the first steam supply pipe 310.

The second steam supply pipe 330 is provided with a plurality of second discharge holes 331 along the length direction X of the tank 100 to supply steam in an opposite direction to the first discharge hole 311.

That is, the plurality of second discharge holes 311 are formed along the length direction of the second steam supply pipe 330 to be toward the upper portion 140 of the tank 100, unlike the nozzle part 230 and the first discharge hole 311.

Therefore, the steam is supplied to be toward the upper portion 140 of the tank 100 from the lower portion 150 of the tank 100 through the second discharge hole 331 of the second steam supply pipe 320.

The blocking plate 340 is installed at the first steam supply pipe 310 and the upper portion to which the connection pipe 320 is connected to allow the blocking plate 340 and the connection pipe 320 to partition the inside of the tank 100 into a first section 110 and a second section 120 along the length direction X of the tank 100.

As such, the inside of the tank is partitioned into two partitions by the blocking plate 340 and the connection pipe 320 without the additional baffle, thereby saving manufacturing costs and time of the deaerator and reducing or minimizing the size of the deaerator.

As illustrated in FIGS. 3 and 4, the spray unit 180 of the deaerator 10 according to the first and second embodiments of the present disclosure includes a water supply pipe 210, a distribution pipe 220, and a plurality of nozzle parts 230.

One side of the water supply pipe 210 is connected to water supply parts such as a water supply source or a water reservoir and the other side of the water supply pipe 210 is connected to the upper portion 140 inside the tank 100. Water is supplied to the inside of the tank 100 through the water supply pipe 210.

The distribution pipe 220 communicates with the other side of the water supply pipe 210 and is extended along the length direction X of the tank 100.

The distribution pipe 220 is extended along the length direction X of the tank 100, thereby increasing a contact surface area and a residence time of water with steam.

The plurality of nozzle parts 230 are formed in the distribution pipe 220 along the length direction X of the tank 100 to spray water toward the lower portion 150 inside the tank 100 in a droplet form.

Water is supplied over the wide area of the tank 100 in droplet form by the plurality of nozzle parts 230, thereby increasing the contact surface area of steam with water.

As illustrated in FIGS. 3 and 4, the bleed unit 400 of the deaerator 10 according to the first and second embodiments of the present disclosure includes a bleed pipe 410 and a bleed valve 420.

The bleed pipe 410 is formed in a pipe form having a cavity formed therein. One side of the bleed pipe 410 is connected to the upper portion 140 inside the tank 100 and the other side of the bleed pipe 410 is adjacently installed to the spray unit 180 to communicate with the outside of the tank.

The bleed valve 420 is installed at a portion of the bleed pipe 410. Although not necessarily limited thereto, the bleed valve 420 may be formed in various forms such as a check valve and a proportional pressure reducing valve and the bleed valve 420 may be opened and closed by a control unit of a power plant as needed.

As the bleed unit 400 is adjacently installed to the spray unit 180, air deaerated from water may quickly bleed to the outside of the tank 100.

As illustrated in FIGS. 3 and 4, in the deaerator 10 according to the embodiment of the present disclosure, the baffle 600 has one baffle 200 installed at a center inside the tank along the height direction Z of the tank 100 to partition the tank 100 into three sections from side to side, a first section 110, a second section 120, and a third section 130 along the length direction X of the tank 100 based on the blocking plate 340 and the baffle 200.

In this case, the spray unit 180 and the bleed unit 400 are installed at the upper portion of the first section 110 of the tank 100 and the first steam supply pipe 310 is installed in the first section 110.

The connection pipe 320 and the second steam supply pipe 330 are installed in the second section.

As such, the spray unit 180 and the first steam supply pipe 310 are installed in the first section 110 and the nozzle part 230 of the spray unit 180 and the first discharge hole 311 are installed to be toward the lower portion 150 of the tank 100, such that the water stored in the first section 110 drops to be toward the lower portion 150 of the tank 100.

Further, the connection pipe 320 and the second steam supply pipe 330 are installed in the second section 120, the third discharge hole 321 of the connection pipe 320 is installed in the width direction of the tank, and the second discharge hole 331 is installed to be toward the upper portion 140 of the tank 100, such that the water stored in the second section 120 rises to be toward the upper portion 140 of the tank 100.

As such, a flow of the water stored in the first section 110 of the tank 100 and a flow of the water stored in the second section 120 thereof are opposite to each other to increase the generation of turbulence, thereby improving deaeration efficiency.

As illustrated in FIG. 4, in the deaerator 10 according to the second embodiment of the present disclosure, the second section 120 and the third section 130 communicate with each other by a communication hole 160 formed between a lower end portion of the baffle 600 and a lower end portion of the tank 100.

Therefore, turbulence is generated in water in the tank 100 and thus the water is mixed well, thereby increasing the deaeration efficiency.

As illustrated in FIGS. 3 and 4, the discharge pipe 500 of the deaerator 10 according to the first and second embodiments of the present disclosure is installed at the lower portion 150 of the third section 120 of the tank 100.

As a result, it is possible to increase the deaeration efficiency by increasing the residence time of water in the tank 100.

Figure 5:
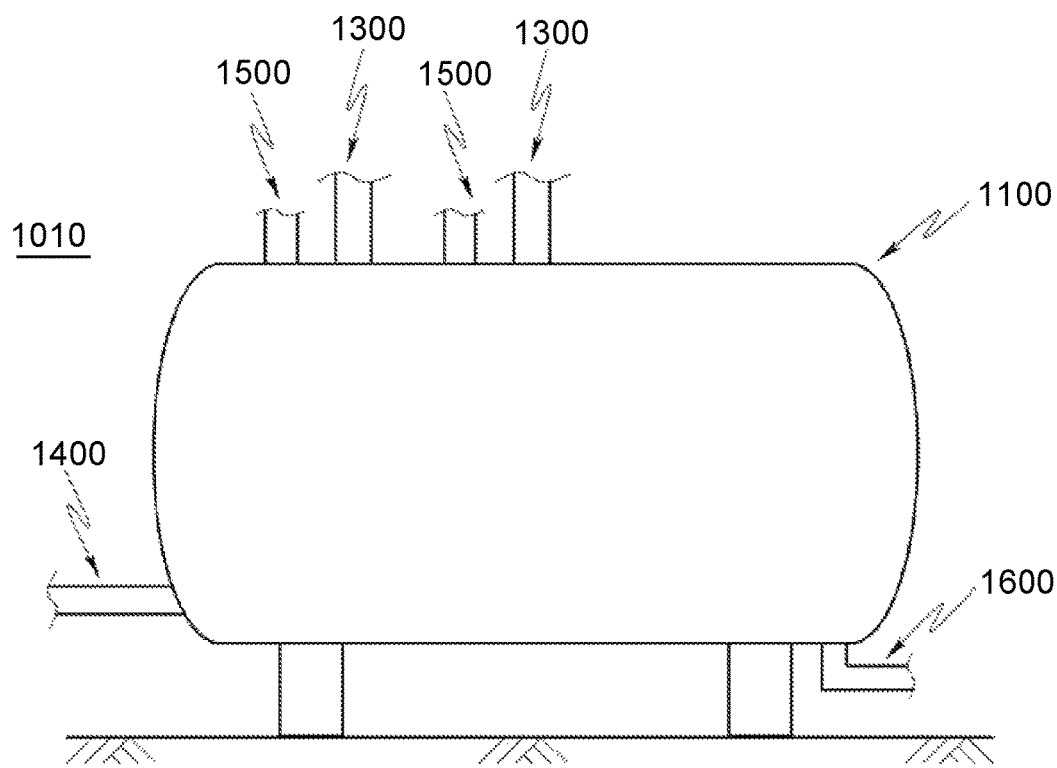
FIG. 5 is a front view of a deaerator according to a third embodiment of the present disclosure.
Figure 6:
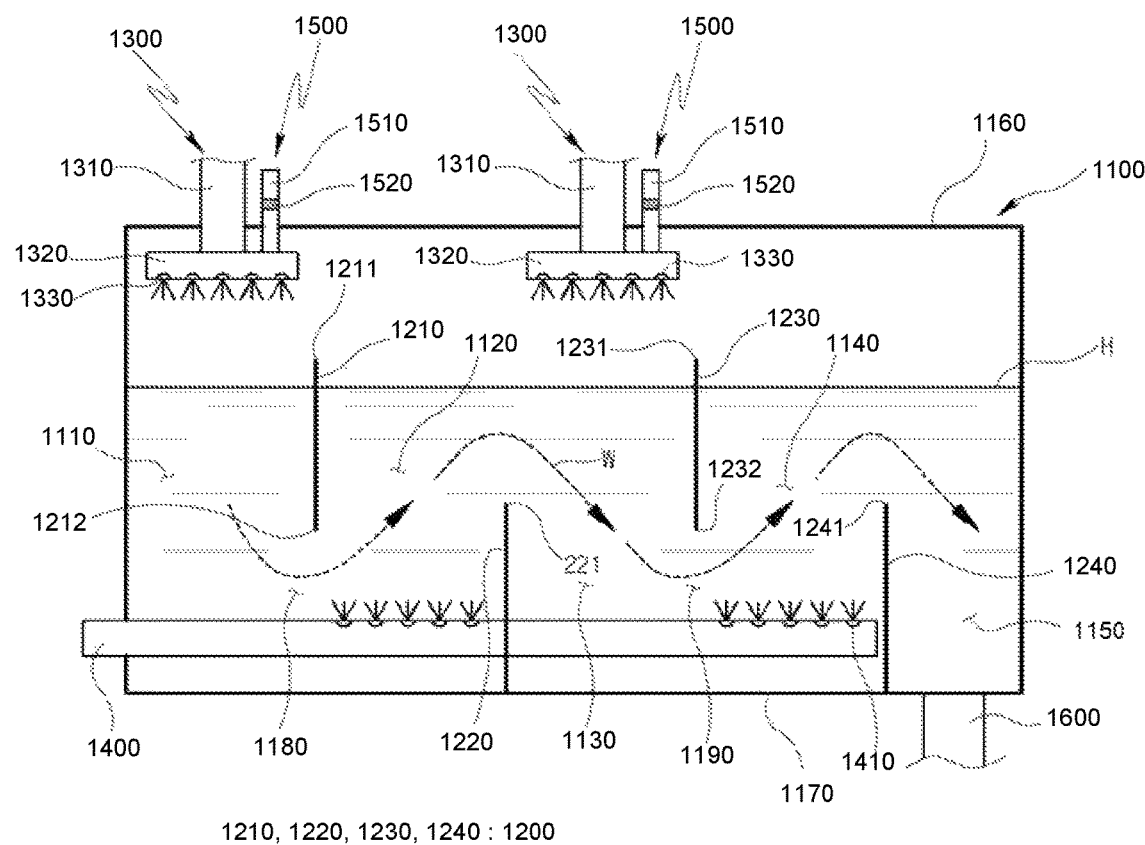
FIG. 6 is a cross-sectional view of FIG. 5.
Figure 7:
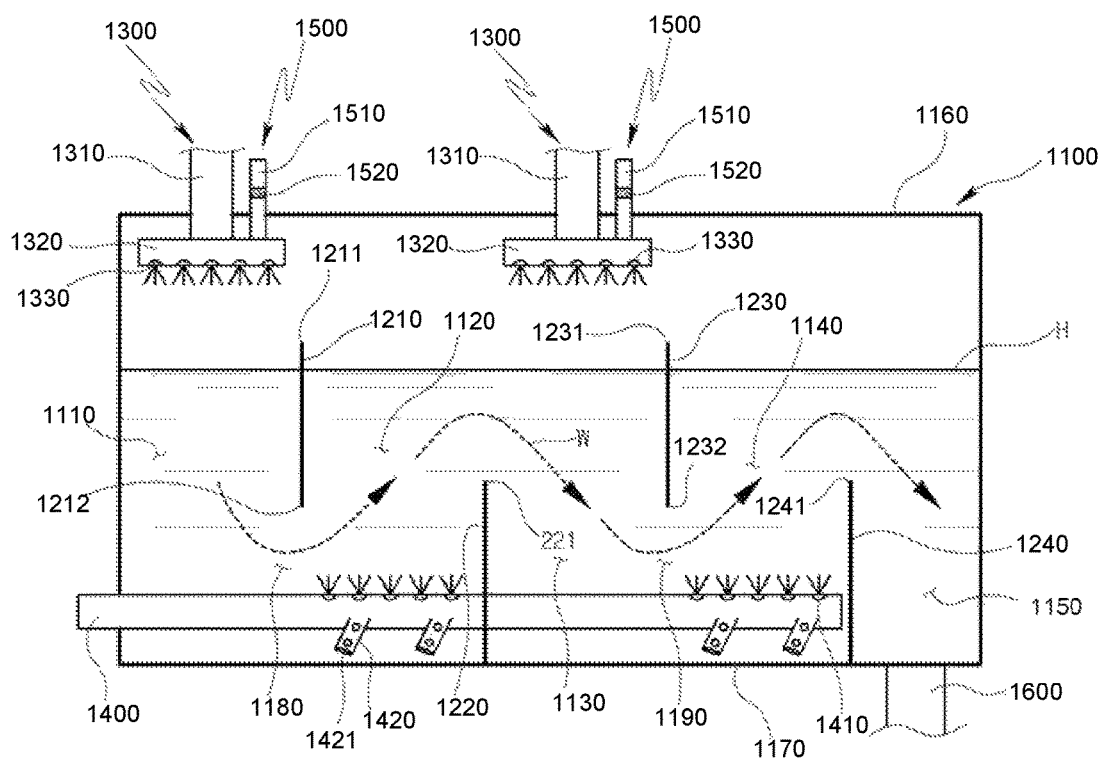
FIG. 7 is a cross-sectional view of a deaerator according to a fourth embodiment of the present disclosure.

FIG. 5 is a front view of a deaerator according to a third embodiment of the present disclosure and FIG. 6 is a front cross-sectional view (through the middle of tank 100) of FIG. 5. FIG. 7 is a cross-sectional view of a deaerator according to a fourth embodiment of the present disclosure.

A deaerator 1010 according to a third embodiment of the present disclosure will be described with reference to FIGS. 5 and 6.

The deaerator 1010 according to the third embodiment of the present disclosure includes a tank 1100, a plurality of baffles 1200, a plurality of spray units 1300, a main steam supply pipe 1400, a plurality of bleed units 1500, and a discharge pipe 1600.

The tank 1100 includes a predetermined length, height, and width. That is, the tank 1100 includes a predetermined volume and forms an appearance of the deaerator 1010.

FIGS. 5 to 7 illustrate that the tank 1100 is formed in a cylindrical shape, but the shape of the tank 1100 is not necessarily limited thereto and therefore the tank 1100 may be formed in a rectangular parallelepiped shape or any other shape.

The plurality of baffles 1200 are installed inside the tank 1100 to partition an inside of the tank 1100.

The plurality of spray units 1300 are installed at an upper portion 1160 of the tank 1100. Water is supplied to the inside of the tank 1100 in a droplet form by each of the spray units 1300.

The main steam supply pipe 1400 is extended along a length direction X of a lower portion 1170 inside the tank 1100. Although not necessarily limited thereto, the main steam supply pipe 1400 of the deaerator 1010 according to the embodiment of the present disclosure is formed below a highest water level H in the tank 1100 and thus is installed to submerge under water.

In the main steam supply pipe 1400, a plurality of discharge holes 1410 are installed along the length direction of the main steam supply pipe 1400 to be toward nozzle parts 1330 to be described below, such that the steam is supplied from the lower portion 1170 of the tank 1100 toward the upper portion 1160 of the tank 1100 through the main steam supply pipe 1400.

The plurality of bleed units 1500 are installed at the upper portion 1160 of the tank 1100 to be adjacent to each of the spray units 1300.

Air without water bleeds to an outside of the tank 1100 through each of the bleed units 1500.

To discharge the water without air to the outside of the tank 1100, a discharge pipe 1600 is installed at a portion of the tank 1100.

As illustrated in FIGS. 6 and 7, the plurality of spray units 1300 of the deaerator 1010 according to the first and second embodiments of the present disclosure each include a water supply pipe 1310, a distribution pipe 1320, and a plurality of nozzle parts 1330.

One side of the water supply pipe 1310 is connected to water supply parts such as a water supply source or a water reservoir and the other side of the water supply pipe 1310 is connected to the upper portion 1160 inside the tank 1100. Water is supplied to the inside of the tank 1100 through the water supply pipe 1310.

The distribution pipe 1320 communicates with the other side of the water supply pipe 1310 and is extended along the length direction X of the tank 1100.

The distribution pipe 1320 is extended along the length direction X of the tank 1100, thereby increasing a contact surface area and a residence time of water with steam.

The plurality of nozzle parts 1330 are formed in the distribution pipe 1320 along the length direction X of the tank 1100 to spray water toward the lower portion 1170 inside the tank 100 in a droplet form.

Water is supplied over a wide area of the tank 1100 in droplet form by the plurality of nozzle parts 1330, thereby increasing the contact surface area of steam with water.

As illustrated in FIGS. 6 and 7, the plurality of bleed units 1500 of the deaerator 1010 according to the first and second embodiments of the present disclosure include a bleed pipe 1510 and a bleed valve 1520.

The bleed pipe 1510 is formed in a pipe form having a cavity formed therein. One side of the bleed pipe 1510 is connected to the upper portion 1160 inside the tank 1100 and the other side of the bleed pipe 1510 is adjacently installed to the spray unit 1300 to communicate with the outside of the tank.

The bleed valve 1520 is installed at a portion of the bleed pipe 1510. Although not necessarily limited thereto, the bleed valve 1520 may be formed in various forms such as a check valve and a proportional pressure reducing valve and the bleed valve 1520 may be opened and closed by a control unit of a power plant as needed.

As each of the bleed units 1500 is adjacently installed to each of the spray units 1300, air deaerated from water may quickly bleed to the outside of the tank 1100.

As illustrated in FIGS. 6 and 7, in the deaerator 1010 according to the first and second embodiment of the present disclosure, the inside of the tank 1100 is provided with a first baffle 1210, a second baffle 1220, a third baffle 1230, and a fourth baffle 1240, in which the adjacent baffles of the first, second, third, and fourth baffles 1210, 1220, 1230, and 1240 are installed at different heights along the length direction X of the tank 1100.

That is, the first baffle 1210 is installed at a different height from the second baffle 1220 adjacent to the first baffle 1210. Further, the second baffle 1220 is installed at a different height from the first baffle 1210 and the third baffle 1230 adjacent to the second baffle 1220. Further, the third baffle 1230 is installed at a different height from the second baffle 1220 and the fourth baffle 1240 adjacent to the third baffle 1230.

Further, as illustrated in FIGS. 6 and 7, each partition (first, second, third, fourth, and fifth sections inside the tank) of the tank 1100 in which the spray unit 1300 and the bleed unit 1500 are installed and each partition (first, second, third, fourth, and fifth sections inside the tank) of the tank in which the plurality of discharge holes 1410 of the main steam supply pipe 1400 are differently formed in the tank 1100.

As illustrated in FIGS. 6 and 7, although not necessarily limited thereto, in the deaerator 1010 according to the exemplary embodiment of the present disclosure, the spray unit 1300 and the bleed unit 1500 are each installed at the upper portion 1160 of the tank 1100 of the first section 1110 and the third section 1130 of the tank 1100. As a result, water is mainly sprayed to the first section 1110 and the third section 1130 and the water stored in the first section 1110 and the third section 1130 drops from the first section 1110 and the third section 1130 toward the lower portion 1170 of the tank 1100.

The plurality of discharge holes 1410 of the main steam supply pipe 1400 are formed only along the length direction of the main steam supply pipe 1400 installed in the second section 1120 and the fourth section 1140 of the tank 1100, such that steam is supplied only from the section 1120 and the fourth section 1140.

As a result, the water stored in the second section 1120 and the fourth section 1140 rises from the second section 1120 and the fourth section 1140 toward the upper portion 1160 of the tank 1100.

As illustrated in FIGS. 6 and 7, according to the exemplary embodiment of the present disclosure, the first baffle 1210 and the third baffle 1230 are installed at the same height along a height direction Z of the tank 1100 and the second baffle 1220 and the second baffle 1240 are installed at the same height along the height direction Z of the tank 1100.

The first and third baffles 1210 and 1230 are installed above the second and fourth baffles 1220 and 1240 along the height direction Z of the tank 1100.

The inside of the tank 1100 is partitioned into five sections, the first section 1110, the second section 1120, the third section 1130, the fourth section 1140, and the fifth section 1150 along the length direction of the tank 1100 by the first, second, third, and fourth baffles 1210, 1220, 1230, and 1240.

As such, the inside of the tank 1100 is partitioned into five partitions by the first, second, third, and fourth baffles 1210, 1220, 1230, and 1240 to increase the generation of turbulence due to the flow of water stored inside the tank 1100, thereby improving the deaeration efficiency.

Further, the first baffle 1210 and the third baffle 1230 are installed inside the tank 1100 so that an upper end portion 1211 of the first baffle 1210 and an upper end portion 1231 of the third baffle 1230 are positioned above the highest water level H of the water stored inside the tank 1100.

Further, the first baffle 1210 and the third baffle 1230 are installed inside the tank 1100 so that a lower end portion 1212 of the first baffle 1210 and a lower end portion 1232 of the third baffle 1230 are positioned below an upper end portion 1221 of the second baffle 1220 and an upper end portion 1241 of the fourth baffle 1240 along the height direction Z of the tank.

As illustrated in FIGS. 6 and 7, the first section 1110 and the second section 1120 of the tank 1100 of the deaerator 1010 communicate with each other by a first communication hole 1180 formed between the lower end portion 1212 of the first baffle 1210 and the main steam supply pipe 1400.

Further, the third section 1130 and the fourth section 1140 of the tank 1100 of the deaerator 1010 communicate with each other by a second communication hole 1190 formed between the lower end portion 1232 of the third baffle 1230 and the main steam supply pipe 1400.

As a result, a channel through which a flow W of water is generated is formed in a direction from the first section 1150 toward the first section 1150 along the length direction inside the tank 1100.

Further, as the flow W of water drops by the water sprayed by the spray unit 1300 in the first section 1110 and the third section 1130 and rises by the steam sprayed through the discharge hole 1410 of the main steam supply pipe 1400 in the second section 1120 and the fourth section 1140, water is circulated so that an up and down direction and a left and right direction of the flow of water in a direction from the first section 1110 toward the fifth section 1150 are opposite to each other.

As a result, as the inside of the tank 1100 is partitioned in five spaces (first, second, third, fourth, and fifth sections) along the length direction X of the tank by the first, second, third, and fourth baffles 1210, 1220, 1230, and 1240, the spaces (first, second, third, fourth, and fifth sections) in which the plurality of spray units 1300 and the discharge hole 1410 of the main steam supply pipe 1400 are formed are differently formed in each space of the tank, turbulence is generated in the water stored inside of the tank 1100 and water is induced to the discharge pipe while flowing up and down and left and right (reference numeral W in FIGS. 6 and 7), thereby improving or maximizing the deaeration effect.

As illustrated in FIGS. 6 and 7, the discharge pipe 1600 of the deaerator 1010 according to the first and second embodiments of the present disclosure is installed at the lower portion 1170 of the fifth section 1150 of the tank 1100.

As a result, it is possible to increase the deaeration efficiency by increasing the residence time of water in the tank 1100.

As illustrated in FIG. 7, the deaerator 1010 according to the fourth embodiment of the present disclosure is provided with a first auxiliary steam supply pipe 1420 communicating with the main steam supply pipe 1400 and extended from the main steam supply pipe 1400 along a width direction Y of the tank 1100.

The plurality of first auxiliary discharge holes 1421 are formed in the first auxiliary steam supply pipe 1420 along the width direction Y of the tank 1100.

As a result, a discharge area of steam in the tank 1100 is increased and thus the turbulence generation of water in the tank is increased, thereby more increasing the deaeration efficiency.

As described above, as the deaerator 1010 according to the embodiment of the present disclosure generates turbulence in the water stored in the tank and induces the water to the discharge pipe while the water flows up and down and left and right, the deaeration effect is improved or maximized if the size of the tank is maintained or the effect may be maintained and the size of the tank reduced, thereby promoting the miniaturization of the deaerator.

Figure 8:
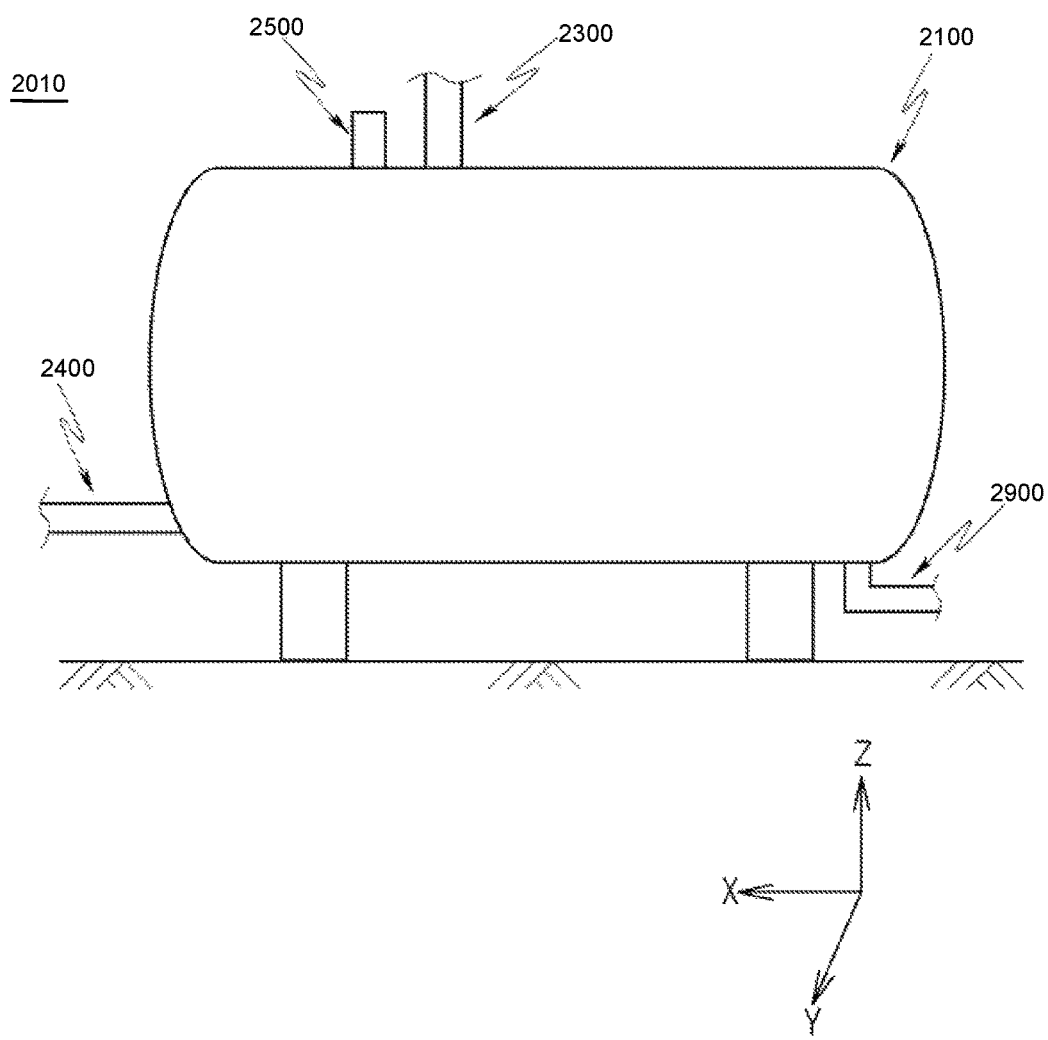
FIG. 8 is a front view of a deaerator according to a fifth embodiment of the present disclosure.
Figure 9:
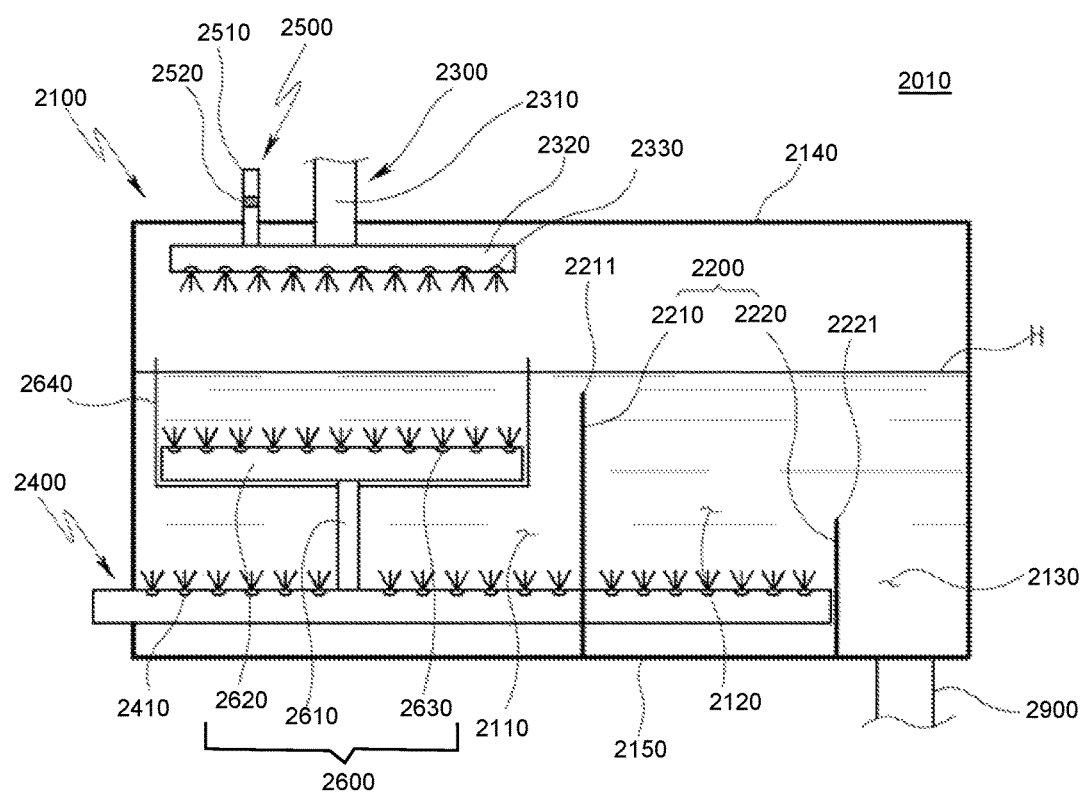
FIG. 9 is a cross-sectional view of FIG. 8.
Figure 10:
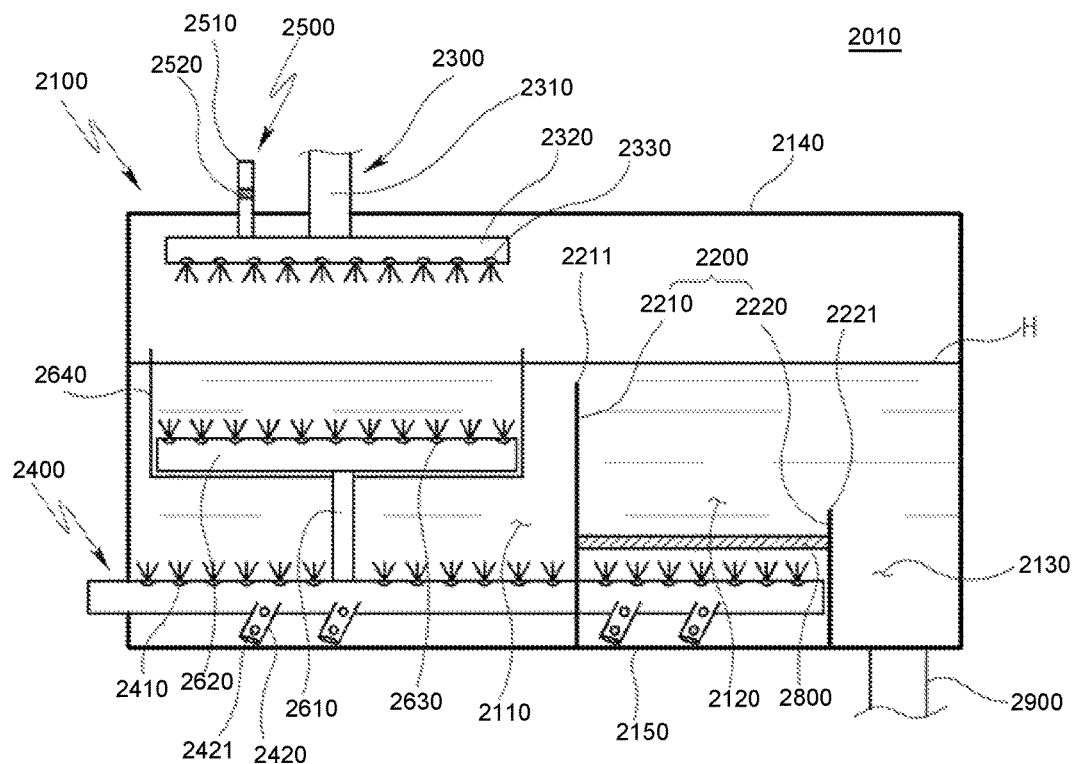
FIG. 10 is a cross-sectional view of a deaerator according to a sixth embodiment of the present disclosure.
Figure 11:
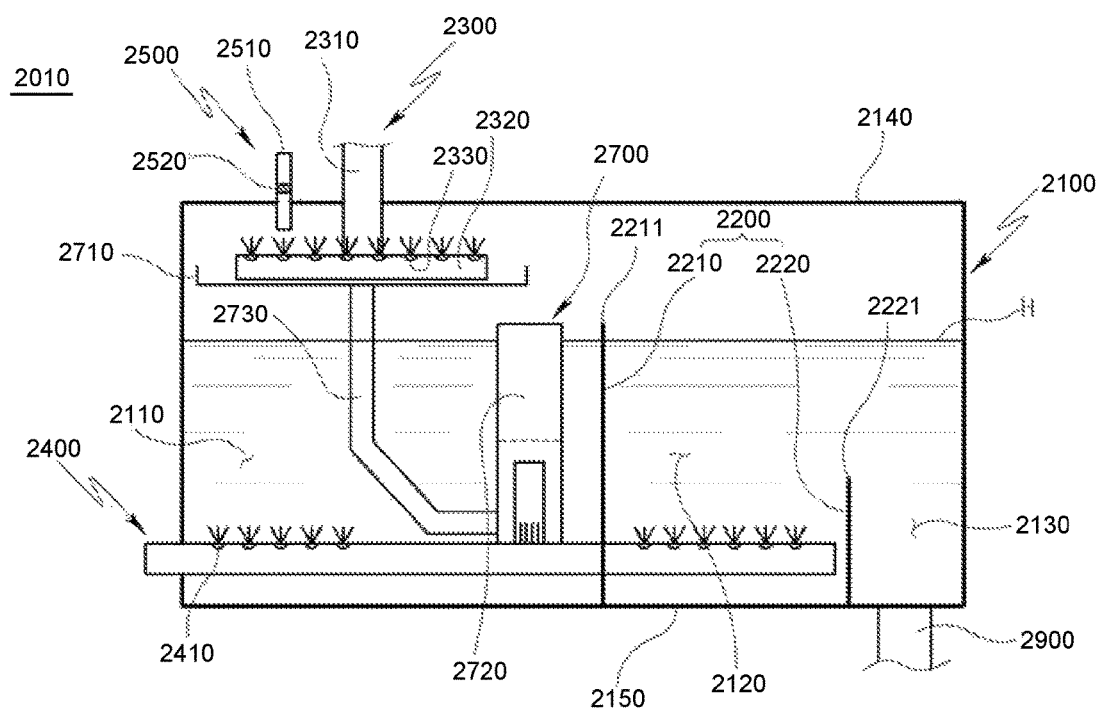
FIG. 11 is a cross-sectional view of a deaerator according to a seventh embodiment of the present disclosure.
Figure 12:
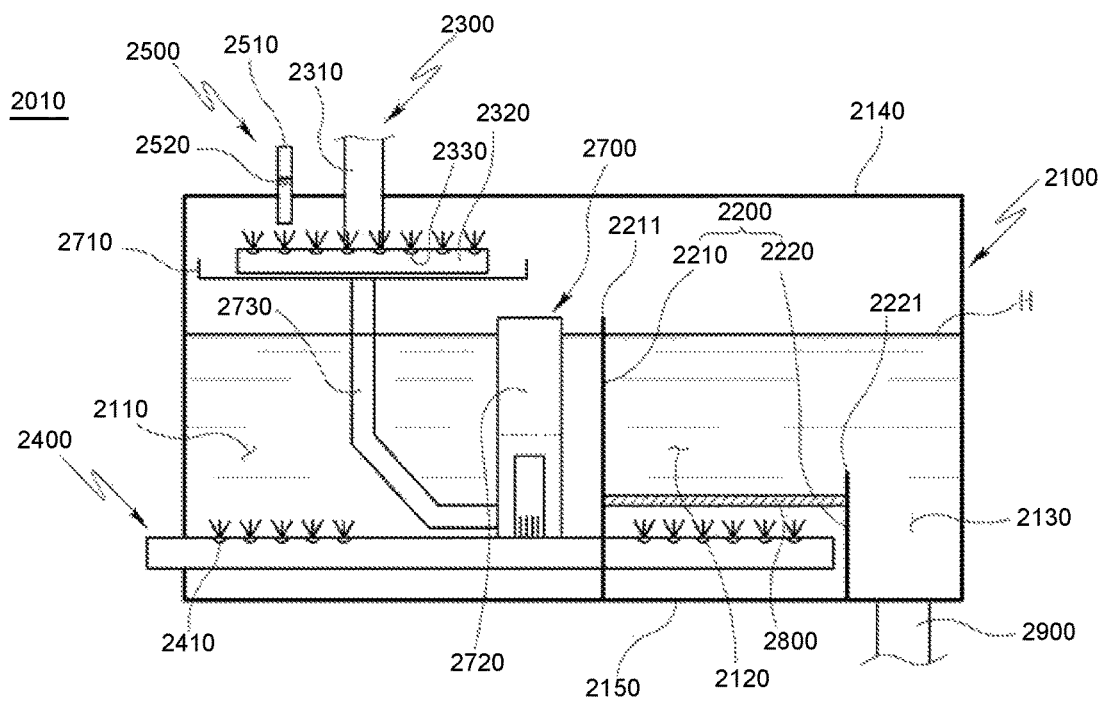
FIG. 12 is a cross-sectional view of a deaerator according to an eighth embodiment of the present disclosure.
Figure 13:
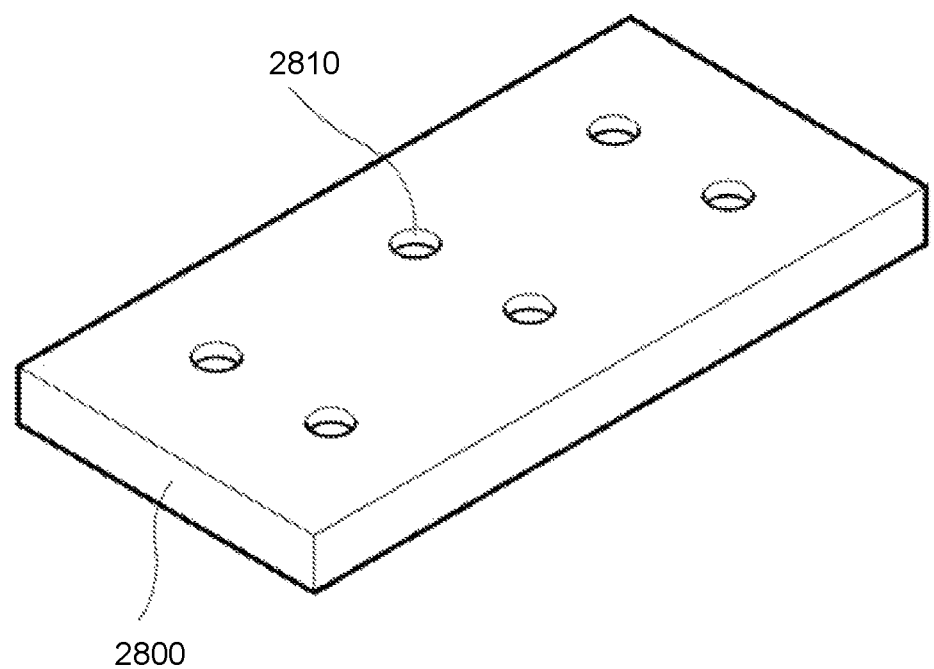
FIG. 13 is a perspective view of a porous plate that may installed in the deaerator according to the present disclosure.

FIG. 8 is a front view of a deaerator according to a fifth embodiment of the present disclosure and FIG. 9 is a front cross-sectional view (through the middle of tank 100) of FIG. 8. FIG. 10 is a cross-sectional view of a deaerator according to a sixth embodiment of the present disclosure, FIG. 11 is a cross-sectional view of a deaerator according to a seventh embodiment of the present disclosure, and FIG. 12 is a cross-sectional view of a deaerator according to an eighth embodiment of the present disclosure. FIG. 13 is a perspective view of a porous plate that may be installed in the deaerator according to the present disclosure.

A deaerator 2010 according to a fifth embodiment of the present disclosure will be described with reference to FIGS. 8 and 9.

The deaerator 2010 according to the fifth embodiment of the present disclosure includes a tank 2100, a baffle 2200, a spray unit 2300, a main steam supply pipe 2400, a bleed unit 2500, a sparger unit 2600, and a discharge pipe 2900.

The tank 2100 includes a predetermined length, height, and width. That is, the tank 2100 includes a predetermined volume and forms an appearance of the deaerator 2010.

FIGS. 8 to 12 illustrate that the tank 2100 is formed in a cylindrical shape, but the shape of the tank 2100 is not necessarily limited thereto and therefore the tank 2100 may be formed in a rectangular parallelepiped shape or any other shape.

The baffle 2200 is installed inside the tank 2100 to partition an inside of the tank 2100.

The spray unit 2300 is installed at an upper portion 2140 of the tank 2100. Water is supplied to the inside of the tank 2100 in droplet form by the spray unit 2300.

The main steam supply pipe 2400 is extended along a length direction X of a lower portion 2150 inside the tank 2100. Although not necessarily limited thereto, the main steam supply pipe 2400 is formed below a highest water level H inside the tank 2100 and is installed to submerge under water.

In the main steam supply pipe 2400, a plurality of discharge holes 2410 are installed along the length direction of the main steam supply pipe 2400 to be toward nozzle parts 2330 to be described below, such that the steam is supplied from the lower portion 2150 of the tank 2100 toward the upper portion 2140 of the tank 2100 through the discharge hole 2410 of the main steam supply pipe 2400.

The bleed unit 2500 is installed at the upper portion 2140 of the tank 2100 to be adjacent to the spray unit 2300.

Air without water bleeds to an outside of the tank 2100 through the bleed unit 2500.

To discharge the water without air to the outside of the tank 2100, a discharge pipe 2900 is installed at a portion of the tank 2100.

Therefore, a combination of a sparger unit facing the spray unit and communicating with the main steam supply pipe to supply steam and the spray unit may be used to maximize the deaeration effect.

As illustrated in FIGS. 9 and 10, the sparger unit 2600 of the deaerator 2010 according to the first and sixth embodiments of the present disclosure includes a vertical connection pipe 2610, an auxiliary steam supply pipe 2620, and a plurality of auxiliary discharge holes 2630.

Further, as illustrated in FIGS. 9 and 10, the sparger unit 2600 of the deaerator 2010 according to the first and sixth embodiments of the present disclosure may include a blocking plate 2640.

The vertical connection plate 2610 communicates with the steam supply pipe 2400 and is installed along a height direction Z of the tank 2100 to be vertical to the main steam supply pipe 2400.

That is, the vertical connection pipe 2610 has one side connected to the main steam supply pipe 2400 installed in the first section 2110 of the tank 2100 and is installed to be vertical to the main steam supply pipe 2400.

The auxiliary steam supply pipe 2620 communicates with the vertical connection pipe 2610 and extended along the length X of the tank 2100 to be parallel with the main steam supply pipe 2400.

That is, the auxiliary steam supply pipe 2620 communicates with the vertical connection pipe 2610 and is installed to be positioned above the main steam supply pipe 2400 along the height direction X of the tank 2010 in the tank 2100 while being parallel with the main steam supply pipe 2400.

The plurality of auxiliary discharge hole 2630 is formed along the length direction of the auxiliary steam supply pipe 2620, that is, the length direction X of the tank 2100.

The plurality of auxiliary discharge holes 2630 are installed in the same direction as the discharge holes 2410 of the main steam supply pipe 2400.

As a result, steam is supplied from the lower portion 2150 of the tank 2100 toward the upper portion 2140 of the tank 2100 through the auxiliary discharge hole 2630.

The blocking plate 2640 is formed to enclose the auxiliary steam supply pipe 2620. As a result, it is possible to increase the deaeration effect by increasing the contact surface areas of water with steam.

As illustrated in FIGS. 9 to 12, the spray unit 2300 of the deaerator 2010 according to the first, second, third, and fourth embodiments of the present disclosure includes a water supply pipe 2310, a distribution pipe 2320, and a plurality of nozzle parts 2330.

One side of the water supply pipe 2310 is connected to water supply parts such as a water supply source or a water reservoir and the other side of the water supply pipe 2310 is connected to the upper portion 2150 inside the tank 2100. Water is supplied to the inside of the tank 2100 through the water supply pipe 2310.

The distribution pipe 2320 communicates with the other side of the water supply pipe 2310 and is extended along the length direction X of the tank 2100.

The distribution pipe 2320 is extended along the length direction X of the tank 2100, thereby increasing a contact surface area and a residence time of water with steam.

The plurality of nozzle parts 2330 are formed in the distribution pipe 2320 along the length direction X of the tank 2100 to spray water toward the lower portion 2150 inside the tank 2100 in a droplet form.

Water is supplied over the wide area of the tank 2100 in the droplet form by the plurality of nozzle parts 2330, thereby increasing the contact surface area of steam with water.

As illustrated in FIGS. 9 to 12, the bleed unit 2500 of the deaerator 2010 according to the first, second, third, and fourth embodiments of the present disclosure includes a bleed pipe 2510 and a bleed valve 2520.

The bleed pipe 2510 is formed in a pipe form having a cavity formed therein. One side of the bleed pipe 2510 is connected to the upper portion 2510 inside the tank 2100 and the other side of the bleed pipe 2510 is adjacently installed to the spray unit 2300 to communicate with the outside of the tank.

The bleed valve 2520 is installed at a portion of the bleed pipe 2510. Although not necessarily limited thereto, the bleed valve 2520 may be formed in various forms such as a check valve and a proportional pressure reducing valve and the bleed valve 2520 may be opened and closed by a control unit of a power plant as needed.

As the bleed unit 2500 is adjacently installed to the spray unit 2300, air deaerated from water may quickly bleed to the outside of the tank 2100.

As illustrated in FIGS. 9 and 10, in the deaerator 2010 according to the first and second embodiments of the present disclosure, the baffle 2200, in particular, the first baffle 2210 and the second baffle 2220 are installed along the height direction Z of the tank 2100 to partition the tank 2100 into three sections (two spaces), a first section 2110, a second section 2120, and a third section 2130 along the length direction X of the tank 2100 based on the first baffle 2210 and the second baffle 2220.

In this case, the spray unit 2300 and the bleed unit 2500 are installed at the upper portion 2140 of the first section 2110 of the tank 2100 and the main steam supply pipe 2400 is installed from the first section 2110 to the second section 2120.

The sparger unit 2600 faces the spray unit 2300 and is installed in the first section 2110 to be positioned at the upper portion of the steam supply pipe 2400.

As illustrated in FIGS. 9 and 10, the first baffle 2210 is installed in the tank 2100 so that an upper end portion 2211 of the first baffle 2210 is positioned above an upper end portion 2221 of the second baffle 2220.

That is, a length of the height direction Z of the tank 2100 of the first baffle 2210 is formed longer than that of the height direction Z of the tank 2100 of the second baffle 2220.

As a result, the deaeration is preferentially performed through the sparger unit 2600 and the spray unit 2300 in the first section 2110 of the tank 2100 and the deaeration is additionally performed in the second section 2120, thereby increasing the deaeration efficiency.

At least one porous plate 2800 is installed at the upper portion of the main steam supply pipe 2400 of the second section 2120 along the length direction X of the tank 2100.

As a result, the deaerator 2010 according to the embodiment of the present disclosure additionally generates turbulence in the water stored in the second section 2120 of the tank 2100 by at least one porous plate 2800 installed at the upper portion of the main steam supply pipe 2400 along the length direction X of the tank 2100 and increases the residence time of steam discharged from the main steam supply pipe 2400 to increase the contact surface area of steam with water, thereby increasing the deaeration effect.

As a result, a primary deaeration is performed by the water supplied from the spray unit 2300 in droplet form, a secondary deaeration is performed by discharging the steam through the plurality of discharge holes 2410 in a state in which the main steam supply pipe 2400 is submerged under water, a third deaeration is performed by the sparger unit 2600, and a fourth deaeration is performed by the porous plate 2800 to improve or maximize the deaeration effect, thereby manufacturing the deaerator smaller than the existing deaerator.

As illustrated in FIGS. 9 and 10, the discharge pipe 2900 of the deaerator 2010 according to the first and second embodiments of the present disclosure is installed at the lower portion 2150 of the third section 2120 of the tank 2100.

As a result, it is possible to increase the deaeration efficiency by increasing the residence time of water in the tank 2100.

As illustrated in FIG. 10, the deaerator 2010 according to the sixth embodiment of the present disclosure is provided with an extended steam supply pipe 2420 communicating with the main steam supply pipe 2400 and extended from the main steam supply pipe 2400 along a width direction Y of the tank 2100.

A plurality of extended discharge holes 2421 are formed in the extended steam supply pipe 2420 along a width direction Y of the tank 2100.

As a result, the number of discharge places of steam in the tank 2100 is increased and thus the turbulence generation of water in the tank is increased, thereby more increasing the deaeration efficiency.

The deaerator 2010 according to third and eighth embodiments of the present disclosure will be described with reference to FIGS. 11 and 12.

The deaerator 2010 according to the third and eighth embodiments of the present disclosure includes the tank 2100, the baffle 2200, the spray unit 2300, the main steam supply pipe 2400, the bleed unit 2500, a scrubber unit 2700, and the discharge pipe 2900.

The tank 2100, the baffle 2200, the spray unit 2300, the main steam supply pipe 2400, the bleed unit 2500, and the discharge pipe 2900 are the same as the first and second embodiments, and therefore a difference between the first and sixth embodiments will be mainly described below.

The scrubber unit 2700 is installed in the first section 2110 to agitate the water supplied from the spray unit 2300 with the steam supplied from the main steam supply pipe 2400.

As illustrated in FIGS. 11 and 12, the plurality of nozzle parts 2330 of the spray unit 2300 of the deaerator 2010 according to the third and eighth embodiment according to the present disclosure are installed along the length direction of the distribution pipe 2320 to spray water toward the upper 2140 inside the tank.

That is, unlike the spray unit 2300 according to the first and sixth embodiments of the present disclosure, the plurality of nozzle parts 2330 of the spray unit 2300 of the deaerator 2010 according to the third and eighth embodiments of the present disclosure are formed in the same direction as the discharge holes 2410 of the main steam supply pipe 2400

As illustrated in FIGS. 11 and 12, the scrubber unit 2700 includes a waterspout part 2710, a scrubber 2720, and a connection pipe 2730.

The waterspout part 2710 collects the water sprayed from the plurality of nozzles parts 2330.

The scrubber 2720 is installed to communicate with the main steam supply pipe 2400.

The connection pipe 2730 connects between the waterspout part 2710 and the main steam supply pipe 2400.

That is, one side of the connection pipe 2730 is connected to the waterspout part 2710 and the other side of the connection pipe 2730 is connected to the scrubber 2720, thereby supplying water to the scrubber 2720.

As a result, the water and the steam are agitated within the scrubber 2720.

As illustrated in FIGS. 11 and 12, in the deaerator 2010 according to the third and fourth embodiments of the present disclosure, the baffle 2220, in particular, the first baffle 2210 and the second baffle 2220 are installed along the height direction Z of the tank 2100 to partition the tank 2100 into three sections (two spaces), the first section 2110, the second section 2120, and the third section 2130 along the length direction X of the tank 2100 based on the first baffle 2210 and the second baffle 2220.

In this case, the spray unit 2300 and the bleed unit 2500 are installed at the upper portion 2140 of the first section 2110 of the tank 2100 and the main steam supply pipe 2400 is installed from the first section 2110 to the second section 2120.

The scrubber unit 2700 is installed in the first section 2110 to be positioned between the spray unit 2300 and the main steam supply pipe 2400.

As illustrated in FIGS. 11 and 12, the first baffle 2210 is installed in the tank 2100 so that an upper end portion 2211 of the first baffle 2210 is positioned above an upper end portion 2221 of the second baffle 2220.

That is, a length in the height direction Z of the tank 2100 of the first baffle 2210 is formed longer than that in the height direction Z of the tank 2100 of the second baffle 2220.

As a result, the deaeration is preferentially performed through the scrubber unit 2700 and the spray unit 2300 in the first section 2110 of the tank 2100 and the deaeration is additionally performed in the second section 2120, thereby increasing the deaeration efficiency.

At least one porous plate 2800 is installed at the upper portion 2100 of the main steam supply pipe 2400 of the second section 2120 along the length direction X of the tank 2100.

As a result, the deaerator 2010 according to the embodiment of the present disclosure additionally generates turbulence in the water stored in the second section 2120 of the tank 2100 by at least one porous plate 2600 installed at the upper portion of the main steam supply pipe 2400 along the length direction X of the tank 2100 and increases the residence time of steam discharged from the main steam supply pipe 2400 to increase the contact surface area of steam with water, thereby increasing the deaeration effect.

As a result, the primary deaeration is performed by the water supplied from the spray unit 2300 in the droplet form, the secondary deaeration is performed by discharging the steam through the plurality of discharge holes 2410 in the state in which the main steam supply pipe 2400 sinks under water, the third deaeration is performed by the scrubber unit 2700, and the fourth deaeration is performed by the porous plate 2800 to improve or maximize the deaeration effect, thereby manufacturing the deaerator smaller than the existing deaerator.

As illustrated in FIGS. 11 and 12, the discharge pipe 2900 of the deaerator 2010 according to the third and fourth embodiments of the present disclosure is installed at the lower portion 2150 of the third section 2120 of the tank 2100.

As a result, it is possible to increase the deaeration efficiency by increasing the residence time of water in the tank 2100.

As illustrated in FIG. 13, the porous plate 2800 according to the embodiments of the present disclosure is provided with the plurality of through holes 2810 having a size enough to pass the steam discharged from the discharge hole 2410 of the main steam supply pipe 2400 regularly or irregularly.

That is, the plurality of through holes 2810 are formed so that the steam discharged from the discharge hole 2410 of the main steam supply pipe 2400 may increase the residence time of the water stored in the tank 2100.

The porous plate 2800 is a flat plate shape and is provided with a plurality of through holes 2810.

Further, if necessary, the porous plate may also be formed in a mesh type.

Therefore, the deaeration according to the present disclosure may use the combination of the sparger unit or the scrubber unit with the spray unit to increase the deaeration efficiency and may maintain the size of the tank of the deaerator at the same size as before and also reduce the size of the tank to manufacture a smaller deaerator while increasing the deaeration effect, thereby promoting the miniaturization of the deaerator.

Figure 14:
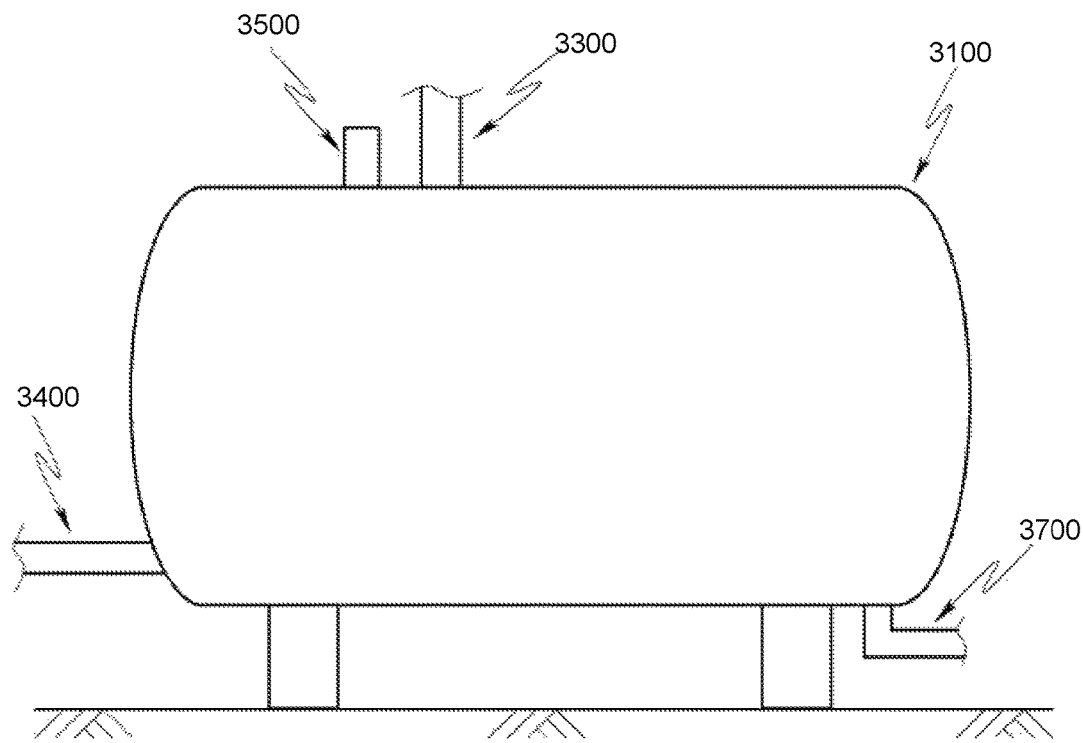
FIG. 14 is a front view of a deaerator according to a ninth embodiment of the present disclosure.
Figure 15:
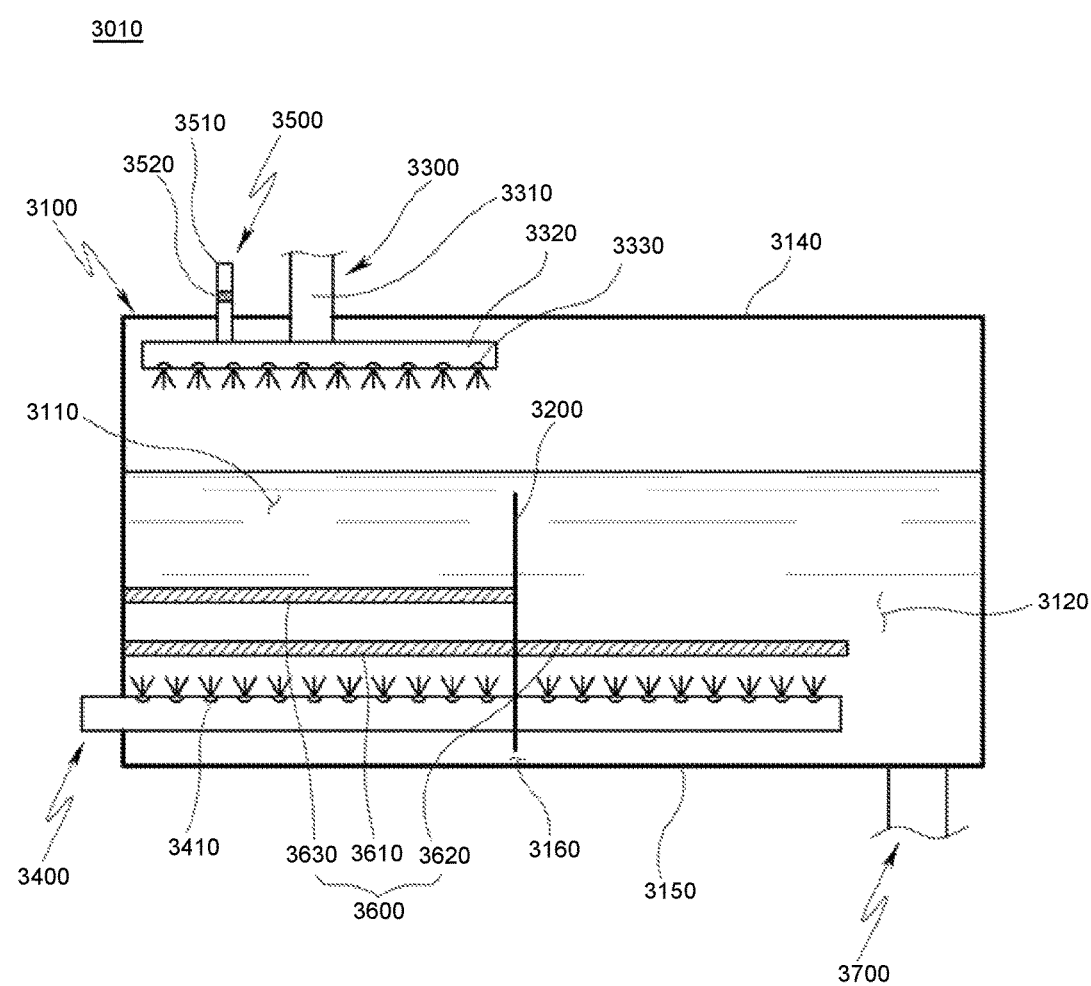
FIG. 15 is a cross-sectional view taken of FIG. 14.
Figure 16:
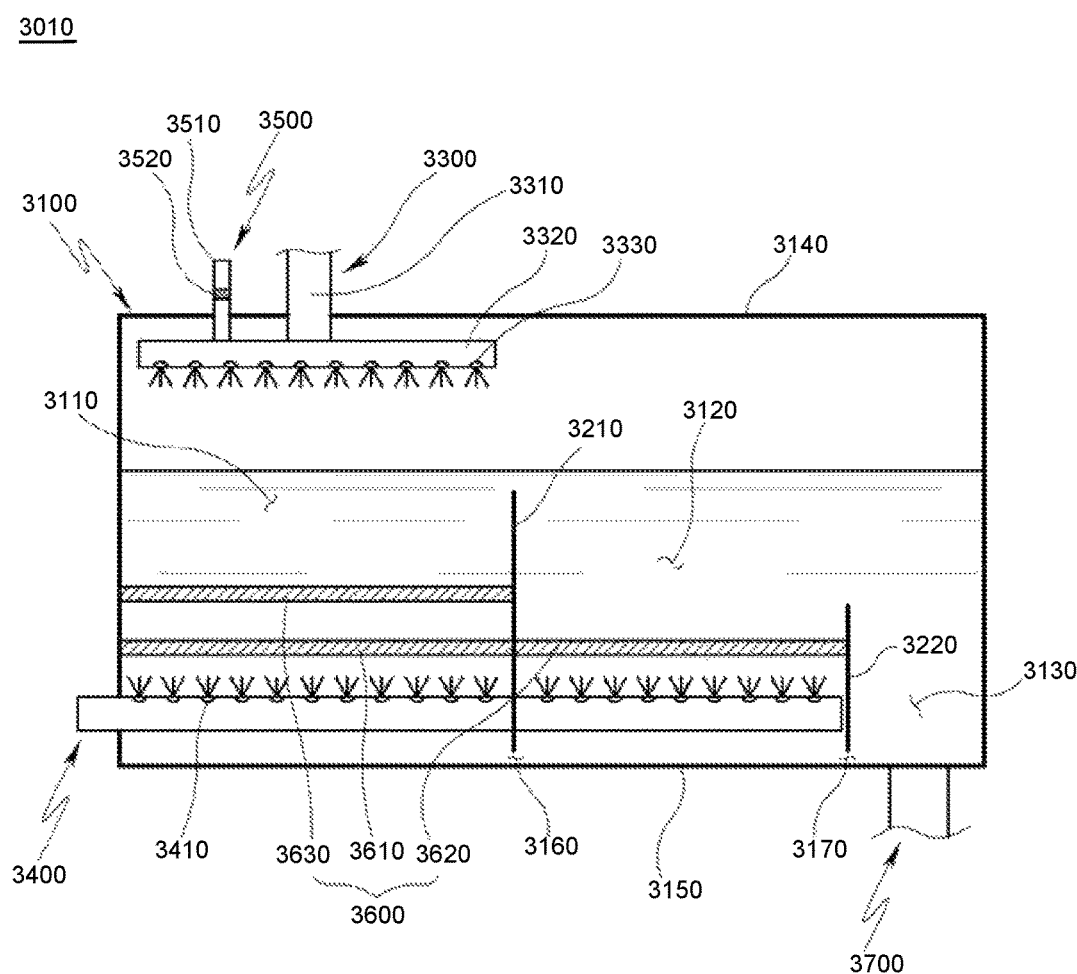
FIG. 16 is a cross-sectional view of a deaerator according to a tenth embodiment of the present disclosure.
Figure 17:
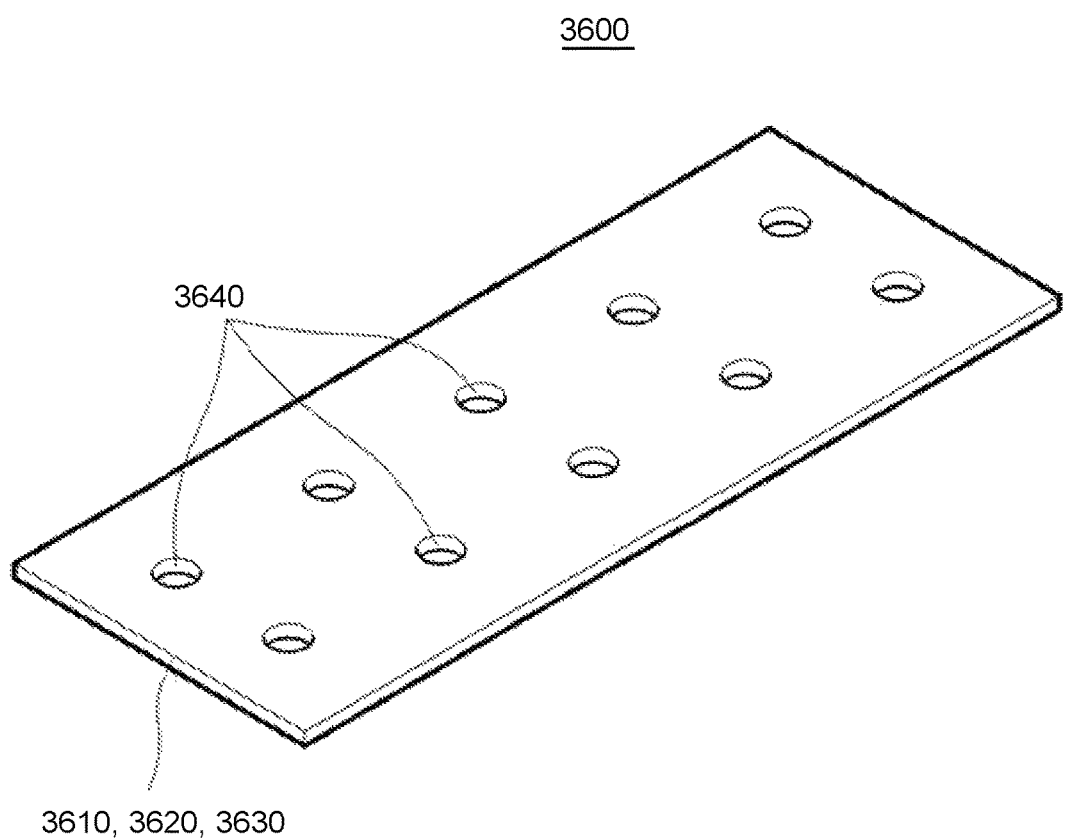
FIG. 17 is a perspective view of a porous plate that may be installed in the deaerator according to the present disclosure.
Figure 18:
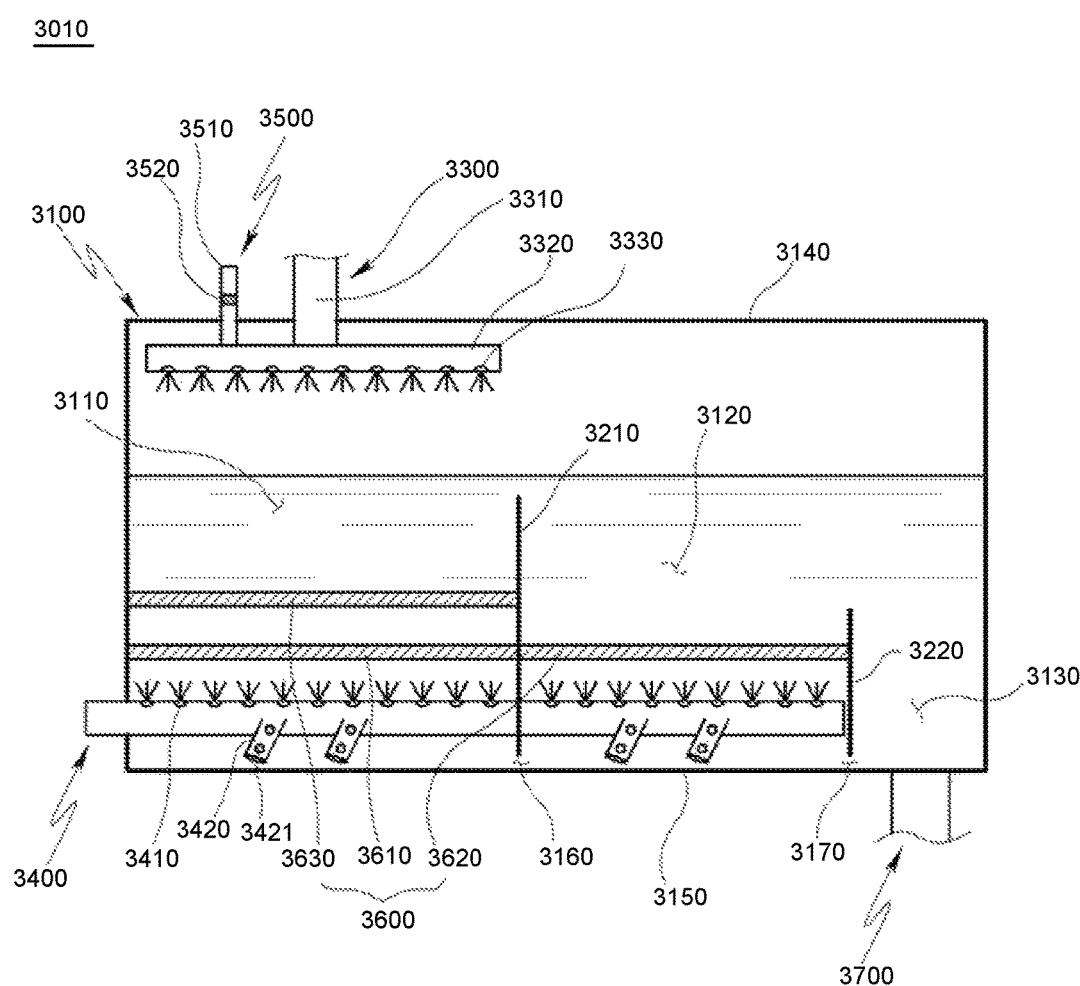
FIG. 18 is a cross-sectional view of a deaerator according to an eleventh embodiment of the present disclosure.
Figure 19:
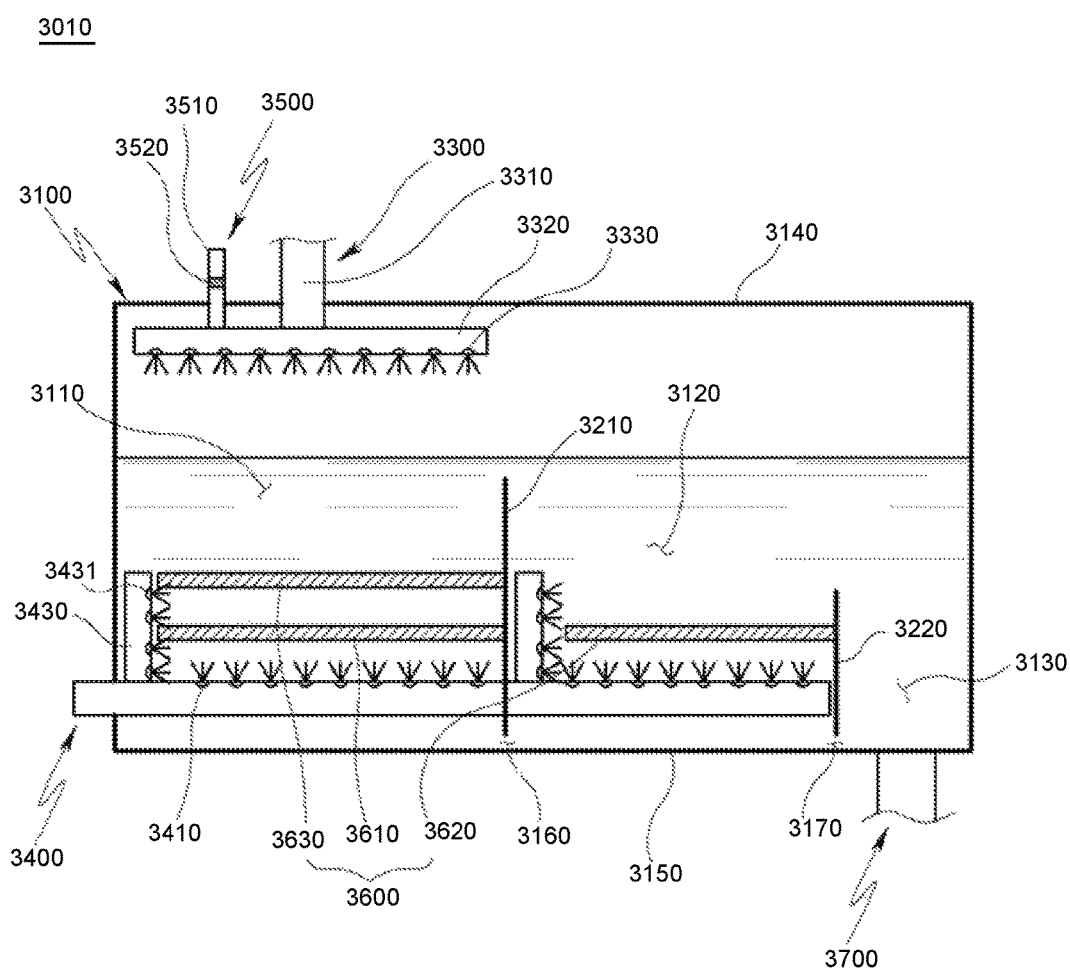
FIG. 19 is a cross-sectional view of a deaerator according to a twelfth embodiment of the present disclosure.

FIG. 14 is a front view of a deaerator according to a ninth embodiment of the present disclosure, FIG. 15 is a front cross-sectional view taken along line A-A (through the middle of tank 100) of FIG. 14, and FIG. 16 is a cross-sectional view of a deaerator according to a tenth embodiment of the present disclosure. FIG. 17 is a perspective view of a porous plate installed in the deaerator according to the present disclosure, FIG. 18 is a cross-sectional view of a deaerator according to an eleventh embodiment of the present disclosure and FIG. 19 is a cross-sectional view of a deaerator according to a twelfth embodiment of the present disclosure.

A deaerator 3010 according to a third embodiment of the present disclosure will be described with reference to FIGS. 14 and 15.

The deaerator 3010 according to the ninth embodiment of the present disclosure includes a tank 3100, a baffle 3200, a spray unit 3300, a main steam supply pipe 3400, a bleed unit 3500, a porous plate 3600, and a discharge pipe 3700.

The tank 3100 includes a predetermined length, height, and width. That is, the tank 3100 includes a predetermined volume and forms an appearance of the deaerator 3010.

FIGS. 14 to 19 illustrate that the tank 3100 is formed in a cylindrical shape, but the shape of the tank 3100 is not necessarily limited thereto and therefore the tank 3100 may be formed in a rectangular parallelepiped shape or any other shape.

The baffle 3200 is installed inside the tank 3100 to partition an inside of the tank 3100.

The spray unit 3300 is installed at an upper portion 3140 of the tank 3100. Water is supplied to the inside of the tank 3100 in droplet form by the spray unit 3300.

The main steam supply pipe 3400 is extended along a length direction X of a lower portion 3150 inside the tank 3100. Although not necessarily limited thereto, the main steam supply pipe 3400 of the deaerator 3010 according to the embodiment of the present disclosure is formed below a highest water level H in the tank 3100 and thus is installed to submerge under water.

In the main steam supply pipe 3400, a plurality of discharge holes 3410 are installed along the length direction of the main steam supply pipe 3400 to be toward nozzle parts 3330 to be described below, such that the steam is supplied from the lower portion 3150 of the tank 3100 toward the upper portion 3140 of the tank 3100 through the main steam supply pipe 3140.

The bleed unit 3500 is installed at the upper portion 3140 of the tank 3100 to be adjacent to the spray unit 3300.

Air without water bleeds to an outside of the tank 3100 through the bleed unit 3500.

At least one porous plate 3600 is installed between the spray unit 3300 and the main steam supply pipe 3400 along the length direction X of the tank 3100.

To discharge the water without air to the outside of the tank 3100, a discharge pipe 3700 is installed at a portion of the tank 3100.

As a result, the deaerator 3010 according to the embodiment of the present invention additionally generates turbulence in the water stored in the tank 3100 by at least one porous plate 3600 installed between the spray unit 3300 and the main steam supply pipe 3400 along the length direction X of the tank 3100 and increases the residence time of steam discharged from the main steam supply pipe 3400 to increase the contact surface area of steam with water, thereby increasing the deaeration effect.

As illustrated in FIGS. 15, 16, 18 and 19, the spray unit 3300 of the deaerator 3010 according to the first, second, third, and fourth embodiments of the present disclosure include a water supply pipe 3310, a distribution pipe 3320, and a plurality of nozzle parts 3330.

One side of the water supply pipe 3310 is connected to water supply parts such as a water supply source or a water reservoir and the other side of the water supply pipe 3310 is connected to the upper portion 3140 inside the tank 3100. Water is supplied to the inside of the tank 3100 through the water supply pipe 3310.

The distribution pipe 3320 communicates with the other side of the water supply pipe 3310 and is extended along the length direction X of the tank 3100.

The distribution pipe 3320 is extended along the length direction X of the tank 3100, thereby increasing a contact surface area and a residence time of water with steam.

The plurality of nozzle parts 3330 are formed in the distribution pipe 3320 along the length direction X of the tank 3100 to spray water toward the lower portion 3150 inside the tank 3100 in a droplet form.

Water is supplied over the wide area of the tank 3100 in the droplet form by the plurality of nozzle parts 3330, thereby increasing the contact surface area of steam with water.

As illustrated in FIGS. 15, 16, 18 and 19, the spray unit 3500 of the deaerator 3010 according to the first, second, third, and fourth embodiments of the present disclosure include a bleed pipe 3510 and a bleed valve 3520.

The bleed pipe 3510 is formed in a pipe form having a cavity formed therein. One side of the bleed pipe 3510 is connected to the upper portion 3510 inside the tank 3100 and the other side of the bleed pipe 3510 is adjacently installed to the spray unit 3300 to communicate with the outside of the tank.

The bleed valve 3520 is installed at a portion of the bleed pipe 3510. Although not necessarily limited thereto, the bleed valve 3520 may be formed in various forms such as a check valve and a proportional pressure reducing valve and the bleed valve 3520 may be opened and closed by a control unit of a power plant as needed.

As the bleed unit 3500 is adjacently installed to the spray unit 3300, air deaerated from water may quickly bleed to the outside of the tank 3100.

As illustrated in FIG. 15, in the deaerator 3010 according to the ninth embodiment of the present disclosure, the baffle 3200 has one baffle 3200 installed at a center inside the tank along the height direction Z of the tank 3100 to partition the tank 3100 into two sections from side to side, a first section 3110 and a second section 3120 according to the length direction X of the tank 3100 based on the baffle 3200.

In this case, the spray unit 3300 and the bleed unit 3500 are installed at the upper portion 3140 of the first section 3100 of the tank 3110 and the main steam supply pipe 3400 is installed from the first section 3110 to the second section 3120.

The first porous plate 3610 is installed along the length direction of the main steam supply pipe 3400, that is, the length direction X of the tank to be positioned between the spray unit 3300 and the main steam supply pipe 3400 in the first section 3110.

That is, the primary deaeration is performed by the water supplied from the spray unit 3300 in the droplet form, the secondary deaeration is performed by the contact of steam with water by discharging the steam through the plurality of discharge holes 3410 in the state in which the main steam supply pipe 3400 sinks under water, and the third deaeration is performed by the porous plate 3600.

As illustrated in FIG. 15, in the deaerator 3010 according to the ninth embodiment of the present disclosure, the first section 3110 and the second section 3120 communicate with each other by a communication hole 3160 formed between a lower end portion of the baffle 3100 and a lower end portion of the tank 3100.

Therefore, the turbulence is generated in water in the tank 3100 and thus the water is mixed well, thereby increasing the deaeration efficiency.

As illustrated in FIG. 15, the discharge pipe 3700 of the deaerator 3010 according to the ninth embodiment of the present disclosure is installed at the lower portion 3150 of the second section 3120 of the tank 3100.

As a result, it is possible to increase the deaeration efficiency by increasing the residence time of water in the tank 3100.

As illustrated in FIG. 16, in the deaerator 3010 according to the tenth embodiment of the present disclosure, the first baffle 3210 and the second baffle 3220 are installed in the tank 3100 along the height direction of the tank to partition the tank into three partitions, the first section 3110, the second section 3120, and the third section 3130 along the length direction X of the tank 3100 based on the first baffle 3210 and the second baffle 3220.

In this case, the spray unit 3300 and the bleed unit 3500 are installed at the upper portion 3140 of the first section 3100 of the tank 3110 and the main steam supply pipe 3400 is installed from the first section 3110 to the second section 3120.

The first porous plate 3610 is installed along the length direction of the main steam supply pipe 3400, that is, the length direction X of the tank to be positioned between the spray unit 3300 and the main steam supply pipe 3400 in the first section 3110.

That is, the primary deaeration is performed by the water supplied from the spray unit 3300 in droplet form, the secondary deaeration is performed by the contact of steam with water by discharging the steam through the plurality of discharge holes 3410 in the state in which the main steam supply pipe 3400 sinks under water, and the third deaeration is performed by the porous plate 3600.

The inside of the tank 3100 is partitioned into three partitions by the first baffles 3210 and 3220 to increase the turbulence generation of the flow of water stored in the tank 3100, thereby improving the deaeration efficiency.

As illustrated in FIG. 16, in the deaerator 3010 according to the tenth embodiment of the present disclosure, the first section 3110 and the second section 3120 communicate with each other by a first communication hole 3160 formed between a lower end portion of the first baffle 3110 and a lower end portion of the tank 3100 and the second section 3120 and the third section 3130 communicate with each other by a second communication hole 3170 formed between a lower end portion of the second baffle 3120 and a lower end portion of the tank 3100.

Therefore, the turbulence is generated in water in the tank 3100 and thus the water is mixed well, thereby increasing the deaeration efficiency.

As illustrated in FIG. 16, the discharge pipe 3700 of the deaerator 3010 according to the tenth embodiment of the present disclosure is installed at the lower portion 3150 of the third section 3130 of the tank 3100.

As illustrated in FIG. 18, the deaerator 3010 according to the eleventh embodiment of the present disclosure is provided with a first auxiliary steam supply pipe 3420 communicating with the main steam supply pipe 3400 and extended from the main steam supply pipe 3400 along a width direction Y of the tank 3100.

The plurality of first auxiliary discharge holes 3421 are formed in the first auxiliary steam supply pipe 3420 along the width direction Y of the tank 3100.

As a result, the number of discharge places of steam in the tank 3100 is increased and thus the turbulence generation of water in the tank is increased, thereby increasing the deaeration efficiency.

As illustrated in FIG. 19, the deaerator 3010 according to the twelfth embodiment of the present disclosure is provided with a second auxiliary steam supply pipe 3430 communicating with the main steam supply pipe 3400 and extended from the main steam supply pipe 3400 along a width direction Z of the tank 3100.

The plurality of second auxiliary discharge holes 3431 are formed in the second auxiliary steam supply pipe 3430 along the height direction Z of the tank 3100.

As a result, the number of discharge places of steam in the tank 3100 is increased and thus the turbulence generation of water in each section in the tank is increased, thereby more increasing the deaeration efficiency.

As illustrated in FIGS. 15, 16, 18 and 19, the deaerator 3010 according to the first, second, third, and twelfth embodiments of the present disclosure may further include a second porous plate 3620 and a third porous plate 3630.

The second porous plate 3620 is installed along the length direction of the main steam supply pipe 3400, that is, the length direction X of the tank 3100 to be positioned at the same height as the first porous plate 3610 in the second section 3120.

As a result, it is possible to more increase the deaeration effect by increasing the residence time of steam even in the first section 3110 and the second 3120 and increasing the contact surface area of water with steam.

The third porous plate 3630 is installed along the length direction of the main steam supply pipe 3400 to be parallel with the first porous plate 3610 while being positioned between the first porous plate 3610 and the spray unit 3300 in the first section 3110. That is, the third porous plate 3630 is installed along the length direction X of the tank 3100 in a multi-stage in the first section 3110.

As a result, it is possible to improve or maximize the deaeration effect by performing a quaternary deaeration by the third porous plate 3630 in the first section 3110.

Therefore, the deaerator according to the embodiment of the present disclosure performs the tertiary and quaternary deviations and the deaeration over a wider area by the first, second, and third porous plates 3610, 3620, and 3630 of the deaerator to increase the deaeration efficiency, maintain the size of the tank of the deaerator at the same size as before or reduce the size of the tank to increase the deaeration effect and promoting miniaturization of the deaerator.

Further, the deaerator according to the embodiment of the present disclosure increases the deaeration efficiency to prevent the tube of the boiler heat exchanger from corroding so as to save the maintenance cost of the thermal power plant and improve the heat exchange performance, thereby increasing the efficiency of the thermal power plant.

As illustrated in FIG. 17, the first, second, and third porous plates 3610, 3620, and 3630 according to the embodiments of the present disclosure are each provided with the plurality of through holes 3640 having a size enough to pass the steam discharged from the discharge hole 3400 of the main steam supply pipe 3410 regularly or irregularly That is, the plurality of through holes 3640 are formed so that the steam discharged from the discharge hole 3410 of the main steam supply pipe 3400 may increase the residence time of the water stored in the tank 3100.

The first, second, and third porous plates 3610, 3620, and 3630 are a flat plate shape and are provided with the plurality of through holes 3640.

Further, if necessary, the porous plate may also be formed in a mesh type.

As a result, according to the deaerator in accordance with the present disclosure, the steam supply unit may be formed to spray the steam sprayed from the steam supply unit in the internal space of the tank in the same or different direction as the water sprayed from the spray unit according to the space in which the spray unit is installed to increase the residence time of the steam and the contact surface area of the steam with the water, thereby improving or maximizing the deaeration effect, reducing or preventing the tube from corroding, and increasing the efficiency of the thermal power plant.

The exemplary embodiments of the present disclosure are not limited to the illustrated modified example and the above-mentioned example, and may be expanded to other examples which belong to a scope of the appended claims. It will be apparent to those skilled in the art that various changes and modifications may be made without departing from the spirit and scope of the embodiments as defined in the following claims.

The embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, the claims should not be limited by the language chosen under a heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein

What is claimed is:

1. A deaerator, comprising:
a tank;
at least one partitioning means disposed inside the tank that partitions the inside of the tank into at least a first section and a second section;
a plurality of nozzles disposed at an upper portion of the first section of the tank to spray water toward a lower portion of the tank in a droplet form and distributed along a length direction of the tank;
a steam supply unit having a plurality of first discharge holes disposed inside the tank and distributed along the length direction of the tank to supply steam to the tank in a same direction as water sprayed from the plurality of nozzles;
a bleed valve disposed at the upper portion of the tank and configured to bleed air from an inside of the tank; and
a discharge pipe configured to discharge deaerated water to an outside of the tank,
wherein the plurality of nozzles spray water to only one of the two sections of the tank to cause different water flow condition from each of the sections,
wherein the steam supply unit includes:
a first steam supply pipe disposed in the first section extending along the length direction of the tank, the first steam supply pipe including the plurality of first discharge holes; and
a second steam supply pipe disposed in the second section extended along the length direction of the tank, the second steam supply pipe including a plurality of second discharge holes distributed along the length direction of the tank and configured to supply steam in a different direction from the plurality of first discharge holes.

2. The deaerator of claim 1, further comprising:
a water supply pipe to supply water to the upper portion of the tank; and
a distribution pipe communicating with the water supply pipe and extending along the length direction of the tank, the plurality of nozzles being longitudinally distributed in the distribution pipe.

3. The deaerator of claim 1, further comprising:
a bleed pipe disposed outside the tank and communicating with the inside of the tank,
wherein the bleed valve is coupled to the bleed pipe.

4. The deaerator of claim 1, wherein the steam supply unit further includes:
a connection pipe disposed in the second section that partitions the inside of the tank and has one side communicating with the first steam supply pipe and the other side communicating with the second steam supply pipe, the connection pipe including a plurality of third discharge holes distributed along a height direction of the tank and configured to supply steam toward a width direction of the tank.

5. A deaerator, comprising:
a tank;
at least one partitioning means disposed inside the tank to partition an inside of the tank into at least a first section and a second section;
a plurality of nozzles disposed at an upper portion of the first section of the tank and configured to supply water to the tank;
a main steam supply pipe extended along a length direction of a lower portion of the tank and configured to supply steam to the tank, the main steam supply pipe including a plurality of discharge holes distributed along the length direction of the tank to supply steam to an upper portion of the tank in a different direction as water sprayed from the plurality of nozzles;
a bleed valve disposed at the upper portion of the tank and configured to bleed air from an inside of the tank;
at least one porous plate installed above the main steam supply pipe along the length direction of the tank; and
a discharge pipe configured to discharge deaerated water to an outside of the tank,
wherein the plurality of nozzles spray water to only one of the two sections of the tank to cause different water flow condition from each of the sections,
wherein a first porous plate of the at least one porous plate is disposed in the first section and extends along a length direction of the main steam supply pipe between the plurality of nozzles and the main steam supply pipe, a second porous plate of the at least one porous plate is disposed in the second section and extends along the length direction of the main steam supply pipe at a same height as the first porous plate, and a third porous plate of the at least one porous plate is disposed to be parallel with the first porous plate in the first section and extends along the length direction of the main steam supply pipe between the first porous plate and the main steam supply pipe, the first section having a multiple stage of porous plate including the first and third porous plates and the second section having a single stage of porous plate including the second porous plate.

6. The deaerator of claim 5, wherein
the at least one partitioning means includes one baffle disposed at a center inside the tank along a height direction of the tank to partition the tank into the first section and the second section, and
the main steam supply pipe is disposed in the first section and the second section.

7. The deaerator of claim 5, wherein
the at least one partitioning means includes a first baffle and a second baffle respectively disposed inside the tank to partition the tank into the first section, the second section, and a third section along the length direction of the tank, and
the main steam supply pipe is disposed in the first section and the second section.

8. The deaerator of claim 7, wherein
the first section and the second section communicate with each other by a first communication hole defined between a lower end of the first baffle and the tank, and the second section and the third section communicate with each other by a second communication hole defined between a lower end of the second baffle and the tank.

9. The deaerator of claim 5, wherein the first, second, and third porous plates are each provided with a plurality of through holes having a size sufficient to pass steam discharged from the main steam supply pipe.

* * * * *